(12) United States Patent
Kindo et al.

(10) Patent No.: US 6,832,217 B1
(45) Date of Patent: Dec. 14, 2004

(54) INFORMATION INQUIRY SUPPORT APPARATUS, INFORMATION INQUIRY SUPPORT METHOD, INFORMATION DISTRIBUTION APPARATUS, AND INFORMATION DISTRIBUTION METHOD

(75) Inventors: Toshiki Kindo, Kanagawa (JP); Hideyuki Yoshida, Kanagawa (JP); Takehiko Shida, Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/571,175

(22) Filed: May 16, 2000

(30) Foreign Application Priority Data

May 19, 1999 (JP) .......................................... 11-138212

(51) Int. Cl.⁷ .............................................. G06F 17/30
(52) U.S. Cl. ...................... 707/3; 707/3; 707/1; 707/5; 707/7; 707/10; 707/6
(58) Field of Search ................................ 707/3, 5, 7, 1, 707/10, 6

(56) References Cited

U.S. PATENT DOCUMENTS

| | | | | |
|---|---|---|---|---|
| 5,020,019 A | * | 5/1991 | Ogawa ........................... 707/5 |
| 5,325,298 A | * | 6/1994 | Gallant ........................... 704/9 |
| 5,446,891 A | | 8/1995 | Kaplan et al. | |
| 5,724,567 A | | 3/1998 | Rose et al. | |
| 5,867,799 A | | 2/1999 | Lang et al. | |
| 5,890,152 A | * | 3/1999 | Rapaport et al. ............... 707/6 |
| 5,930,784 A | * | 7/1999 | Hendrickson ................... 707/2 |
| 6,148,303 A | * | 11/2000 | Morimoto et al. ........... 707/102 |
| 6,181,829 B1 | * | 1/2001 | Clark et al. ................. 382/273 |
| 6,199,067 B1 | * | 3/2001 | Geller .......................... 707/10 |
| 6,256,633 B1 | * | 7/2001 | Dharap ......................... 707/10 |
| 6,408,288 B1 | * | 6/2002 | Ariyoshi ....................... 706/22 |
| 6,622,134 B1 | * | 9/2003 | Sorkin ......................... 706/20 |

FOREIGN PATENT DOCUMENTS

| | | |
|---|---|---|
| JP | 5-204975 | 9/1993 |
| JP | 9-288683 | 11/1997 |
| JP | 10-162028 | 6/1998 |
| JP | 10-240762 | 9/1998 |
| JP | 11-143900 | 5/1999 |
| JP | 11-161670 | 6/1999 |

* cited by examiner

Primary Examiner—John Breene
Assistant Examiner—Kuen S. Lu
(74) Attorney, Agent, or Firm—McDermott Will & Emery LLP

(57) ABSTRACT

An information inquiry support apparatus including means for creating a profile, that is, an evaluation table about each one of plural key words expressing the information content, relating to the user's concern, on the basis of the evaluation about plural pieces of information by the user evaluating presence or absence of concern about presented plural pieces of information, means for entering the specific information for inquiry, information evaluation means for calculating the need signal quantitatively expressing the degree of concern about the specific information for each user by using the profile, and means for quantitatively evaluating the fitness for inquiry, by the magnitude of the value of the need signal, and issuing each name of the plural individual and/or group users.

46 Claims, 15 Drawing Sheets

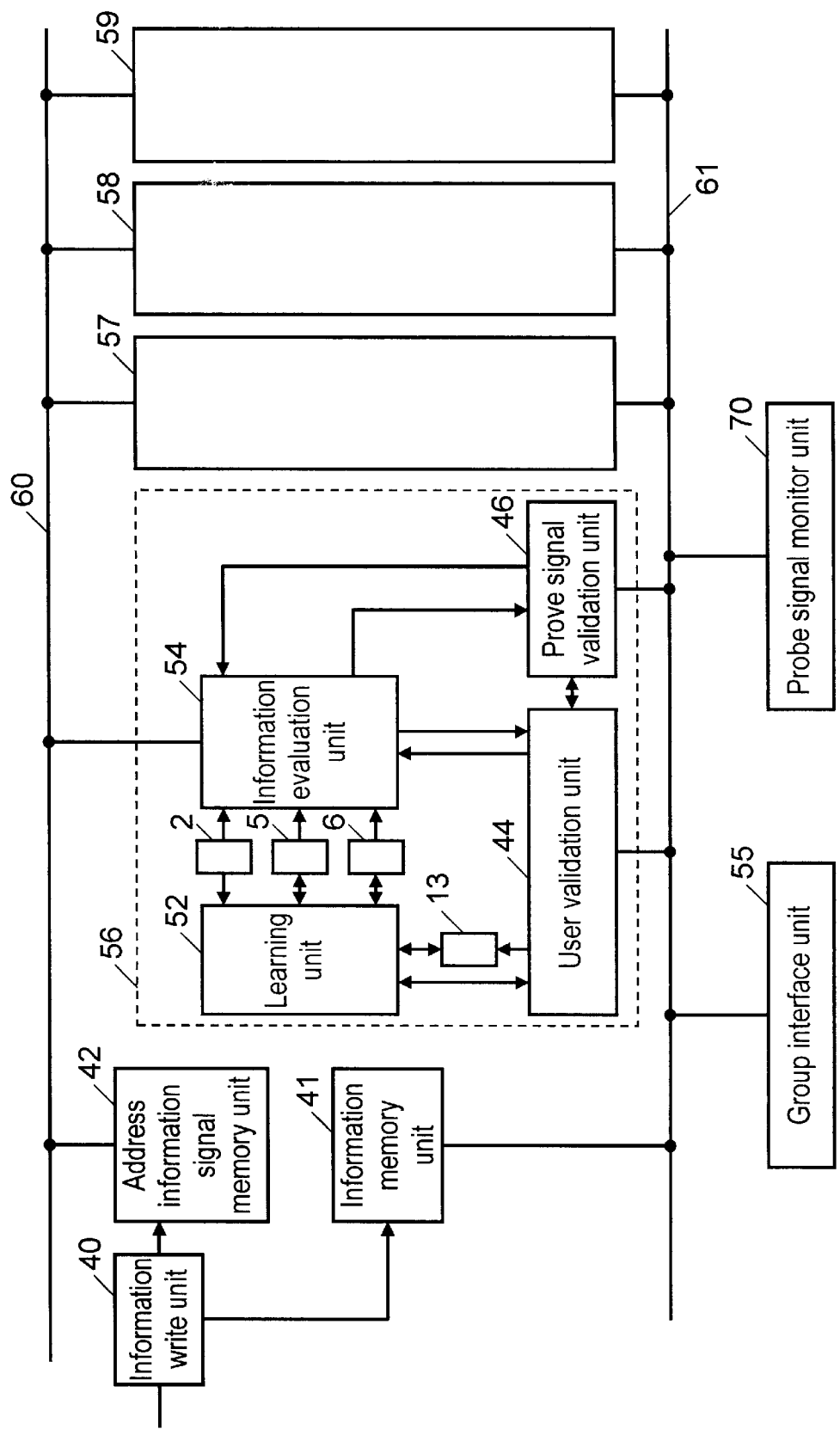

FIG. 2

| Individual filter | ON |
| Group filter | OFF |

Hep-ph [6 Oct, 1997(9)]

| Today | 1 day before | 2 days before | 3 days before | | Learn |
| | | | | | End |

| Need | Button | Title |
| --- | --- | --- |
| 0.0 | Y o ● o N | The AGL Equation from a Dipole Picture (M. B. Gay Ducati, V. P. Gon¥c¢}alves (UFRGS)) |
| 0.0 | Y o ● o N | Relating the Quark and Gluon Condensates Through the QCD Vacuum Energy (E.V. Gorbar and A.A. Natale (Instituto de Fisica Teorica, Sao Paulo, Brazil)) |
| 0.0 | Y o ● o N | Reanalysis of the Four-Quark Operators Relevant to ¥Lambda_b Lifetime from QCD Sum Rule (Chao-Shang Huang, Chun Liu and Shi-Lin Zhu) |
| 0.0 | Y o o ● N | Dynamical Pion Production via Parametric Resonance from Disoriented Chiral Condensate (Hideaki Hiro-Oka and Hisakazu Minakata) |
| 0.0 | Y o ● o N | Small-x final states and the CCFM equation (G.P. Salam) |
| 0.0 | Y o ● o N | Light Cone Condition for a Thermalized QED Vacuum (Holger Gies) |
| 0.0 | Y o ● o N | Nonperturbative Power Corrections in $¥bar¥alpha_s(q^2)$ of Two-Loop Analytization Procedure (Aleksey I. Alekseev) |
| 0.0 | Y o ● o N | Thermodynamics of Deconfined Matter at Finite Chemical Potential in a Quasiparticle Description (A. Peshier, B. Kampfer, G. Soff) |
| 0.0 | Y o o ● N | $J/¥psi + jet$ diffractive production in the direct photon process at HERA (Jia-Sheng Xu, Hong-An peng, Zhan-Yuan Yan, and Zhen-Min He) |

Copyright (c) 1995-1998 Matsushita Research Institute Tokyo, Inc.

FIG. 3

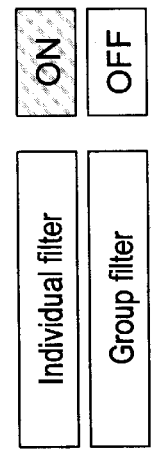

| Individual filter | ON |
| Group filter | OFF |

Hep-ph [6 Oct, 1997(9)]

| Today | 1 day before | 2 days before | 3 days before | | Learn |
| | | | | | End |

| Need | Button | Title |
|---|---|---|
| 23.1 | Y●ooN | Dynamical Pion Production via Parametric Resonance from Disoriented Chiral Condensate (Hideaki Hiro-Oka and Hisakazu Minakata) |
| 1.2 | Yo●oN | Relating the Quark and Gluon Condensates Through the QCD Vacuum Energy (E.V. Gorbar and A.A. Natale (Instituto de Fisica Teorica, Sao Paulo, Brazil)) |
| 1.1 | Yoo●N | Nonperturbative Power Corrections in $bar\alpha\_s(q^2)$ of Two-Loop Analytization Procedure (Aleksey I. Alekseev) |
| 0.9 | Yoo●N | Reanalysis of the Four-Quark Operators Relevant to ¥Lambda_b Lifetime from QCD Sum Rule (Chao-Shang Huang, Chun Liu and Shi-Lin Zhu) |
| 0.7 | Yoo●N | Light Cone Condition for a Thermalized QED Vacuum (Holger Gies) |
| 0.6 | Yoo●N | $J/¥psi + jet$ diffractive production in the direct photon process at HERA (Jia-Sheng Xu, Hong-An Peng, Zhan-Yuan Yan, and Zhen-Min He) |
| 0.5 | Yoo●N | Thermodynamics of Deconfined Matter at Finite Chemical Potential in a Quasiparticle Description (A. Peshier, B. Kampfer, G. Soff) |
| 0.5 | Yoo●N | The AGL Equation from a Dipole Picture (M.B. Gay Ducati, V.P. Gon¥c(c)alves (UFRGS)) |
| -8.4 | Yoo●N | Small-x final states and the CCFM equation (G.P. Salam) |

Copyright (c) 1995-1998 Matsushita Research Institute Tokyo, Inc.

FIG. 4

Individual filter: ON
Group filter: OFF

Hep-ph [4Oct, 1997(15)]

| Today | 1 day before | 2 days before | 3 days before | Learn |
| --- | --- | --- | --- | --- |
| | | | | End |

| Need | Button | Title |
| --- | --- | --- |
| 2.8 | Y o ● o N | A study of Schwinger-Dyson Equations for Yukawa and Wess-Zumino Models (A. Bashir and J. Lorenzo Diaz-Cruz) |
| 2.8 | Y o ● o N | Effective Restoration of the U_A(1) symmetry in the SU(3) linear sigma model (J. Schaffner-Bielich) |
| 1.8 | Y o ● o N | Can the Higgs Boson Bootstrap itself? (Bipin R. Desai and Alexander R. Vaucher (University of California, Riverside, CA)) |
| 1.3 | Y o ● o N | Are electroweak corrections at 1 TeV under control at the 1 % level? (Paolo Ciafaloni) |
| 1.0 | Y o ● o N | Some Topics on Double Heavy Mesons: Heavy Quarkonia and $SB\_c\$$ Meson (Advances and outlooks) (Chao-Hsi Chang (ITP of Chinese Academy of Sciences)) |
| 0.4 | Y o ● o N | Low Mass Higgs Boson Consistent with Precision Experiments: A Consequence of Large Top-Yukawa Coupling in Condensate Models (Bipin R. Desai and Alexander R. Vaucher (University of California, Riverside, CA)) |
| 0.2 | Y o ● o N | Meson Structure in a Relativistic Many-Body Approach (Felipe J. Llanes-Estrada and Stephen R. Cotanch (North Carolina State University, Raleigh NC)) |
| 0.2 | Y o ● o N | More on triangular mass matrices for fermions (H.B. Benaoum (Mainz Uni.)) |
| 0.1 | Y o ● o N | Left-right symmetry and heavy particle quantum effects (M. Czakon, M. Zralek (Univ. Silesia, Katowice), J. Gluza (DESY Zeuthen, Univ. Silesia)) |

FIG. 5

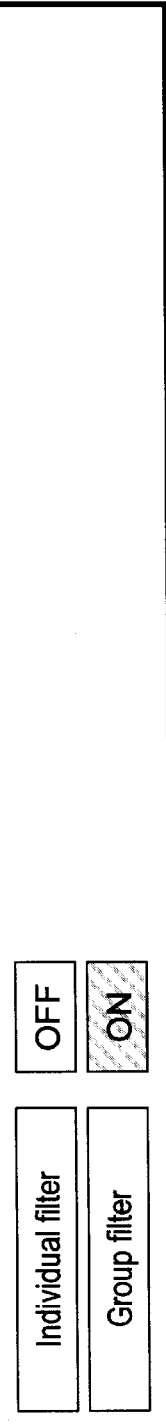

| | Individual filter | OFF | |
| | Group filter | ON | |

Hep-ph [4Oct, 1997(9)]

| Today | 1 day before | 2 days before | 3 days before | Learn |
| | | | | End |

| Need | Button | Title |
|---|---|---|
| 2.9 | YO●ON | Low Mass Higgs Boson Consistent with Precision Experiments: A Consequence of Large Top-Yukawa Coupling in Condensate Models (Bipin R. Desai and Alexander R. Vaucher (University of California, Riverside, CA)) |
| 2.5 | YO○ON | Effective Restoration of the U_A(1) symmetry in the SU(3) linear sigma model (J. Schaffner-Bielich) |
| 1.9 | YO●ON | Can the Higgs Boson Bootstrap itself? (Bipin R. Desai and Alexander R. Vaucher (University of California, Riverside, CA)) |
| 1.7 | YO○ON | More on triangular mass matrices for fermions (H.B. Benaoum (Mainz Uni.)) |
| 1.2 | YO○ON | Are electroweak corrections at 1 TeV under control at the 1 % level? (Paolo Ciafaloni) |
| 0.9 | YO○ON | Some Topics on Double Heavy Mesons: Heavy Quarkonia and $B_c$ Meson (Advances and outlooks) (Chao-Hsi Chang (ITP of Chinese Academy of Sciences)) |
| 0.6 | YO○ON | Meson Structure in a Relativistic Many-Body Approach (Felipe J. Llanes-Estrada and Stephen R. Cotanch (North Carolina State University, Raleigh NC)) |
| 0.5 | YO●ON | Left-right symmetry and heavy particle quantum effects (M. Czakon, M. Zralek (Univ. Silesia, Katowice), J. Gluza (DESY Zeuthen, Univ. Silesia)) |
| 0.4 | YO○ON | A study of Schwinger-Dyson Equations for Yukawa and Wess-Zumino Models (A. Bashir and J. Lorenzo Diaz-Cruz) |

INFORMATION INQUIRY SUPPORT APPARATUS, INFORMATION INQUIRY SUPPORT METHOD, INFORMATION DISTRIBUTION APPARATUS, AND INFORMATION DISTRIBUTION METHOD

FIELD OF THE INVENTION

The present invention relates to an information inquiry support apparatus and an information inquiry support method for supporting to select destination of inquiry about information, by applying an information filtering method for making it easier to pick up necessary information from information memory apparatus or information communication network, and an information distribution apparatus and an information distribution method for distributing information suited to the requirement of the inquirer.

BACKGROUND OF THE INVENTION

Along with the recent advancement in the social foundation for information and communications, the information communication network has become gigantic in scale, and the information communication quantity is sharply increasing. Today, as compared with the information quantity that can be processed by an individual user or a group (a set of plural users), the accessible information quantity is far greater, and the number of partners (individuals, groups, enterprises, etc.) to which the information can be transmitted from one person (or enterprise) is also tremendous. It is hence difficult to acquire the necessary information from a huge quantity of information, or search a person versed in specific information, or find out objects to transmit specific information.

One of the prior arts relating to this need is information retrieval using a key word logical expression. That is, from hundreds of thousands or millions of cases of information, information suited to the key word logical expression is picked up.

In the conventional retrieval using the key word logical expression, however, since the user is requested to set the logical expression adequately about the key word, adequate retrieval (as well as registration of retrieval condition) is impossible unless the user has enough knowledge about characteristics of the stored data group (for example, on which condition is determined the key word of the desired data), and system structure (for example, whether the key word is built in the thesaurus system or not). Therefore, a beginner could not pick up the information (or receive the distribution) adequately.

Yet, the obtained result only conforms to the logical expression about the key word, and if the key word is matched, the information content may be different from what is needed. Besides, it is not easy for the user to pick up the information from the highest degree of concern from numerous retrieval results.

In the inventions previously disclosed by the present applicant, Japanese Laid-open Patent No. 9-288683 and Japanese Laid-open Patent No. 10-240762, the information could be quantitatively evaluated according to the necessity for the user. As a result, the above problems are partly solved (to present the information inquiry support apparatus and information filtering method, allowing even the beginner to filter the information at high precision, easy to pick up information of higher necessity for the user).

The invention in Japanese Patent Application No. 9-308386 previously filed by the present applicant has realized the information filtering apparatus and information filtering method capable of quantifying the effective need even if plural users jointly retrieve the information.

These previous inventions have solved the problems when receiving the information, but have not solved the problems of discovering the person versed in specific information, that is, finding out the destination of inquiry, and distribution of information to proper individuals and/or groups.

The invention, further advanced from the conventional information filtering apparatus and information filtering method, presents an information inquiry support apparatus and an information inquiry support method for finding out the person versed in specific information, and also an information distribution apparatus and an information distribution method for distributing information to proper people efficiently. As a result, in the information communication infrastructure which continues to progress, exchange of information of substantially high quality is realized.

SUMMARY OF THE INVENTION

To achieve the object, the information inquiry support apparatus of the invention, in order to search the user suited for inquiring about specific information, from a plurality of individual users and/or group users using database system or information communication network, comprises learning means for evaluating whether the user is interested or not, about plural pieces of information and creating a profile which is an evaluation table about each one of plural key words, which are elements expressing the information contents, on the basis of the said user evaluation of the plural pieces of information, input means for entering the specific information for inquiry, information evaluation means for calculating the need signal expressing quantitatively the degree of concern about the specific information in every user by using the profile, and means for issuing name of the plurality of individual users and/or group users with the corresponding value of the need signal which represents the degree of fitness to the inquiry.

The information distribution apparatus of the invention further includes an information distribution section for distributing specific information and related information to a plurality of individual users and/or group users high in the concern about the specific information, that is, high in the necessity, by making use of the output content of the information inquiry support apparatus.

Thus, supposing there is information having a specific content, it can be quantitatively evaluated how much the user is interested in this information or needs it. Therefore, the user of the inquiry destination about the information can be easily selected, and the information can be efficiently distributed to the user having high concern and high necessity.

BRIEF DESCRIPTION OF THE DRAWINGS

FIG. 1 is a block diagram of an information inquiry support apparatus in embodiment 1 of the invention.

FIG. 2 shows an example of group interface display screen (initial state).

FIG. 3 shows an example of group interface display screen (after learning process).

FIG. 4 shows an example of group interface display screen (after learning process).

FIG. 5 shows an example of group interface display screen (after learning process).

DETAILED DESCRIPTION OF THE PREFERRED EMBODIMENTS

Figure 6:
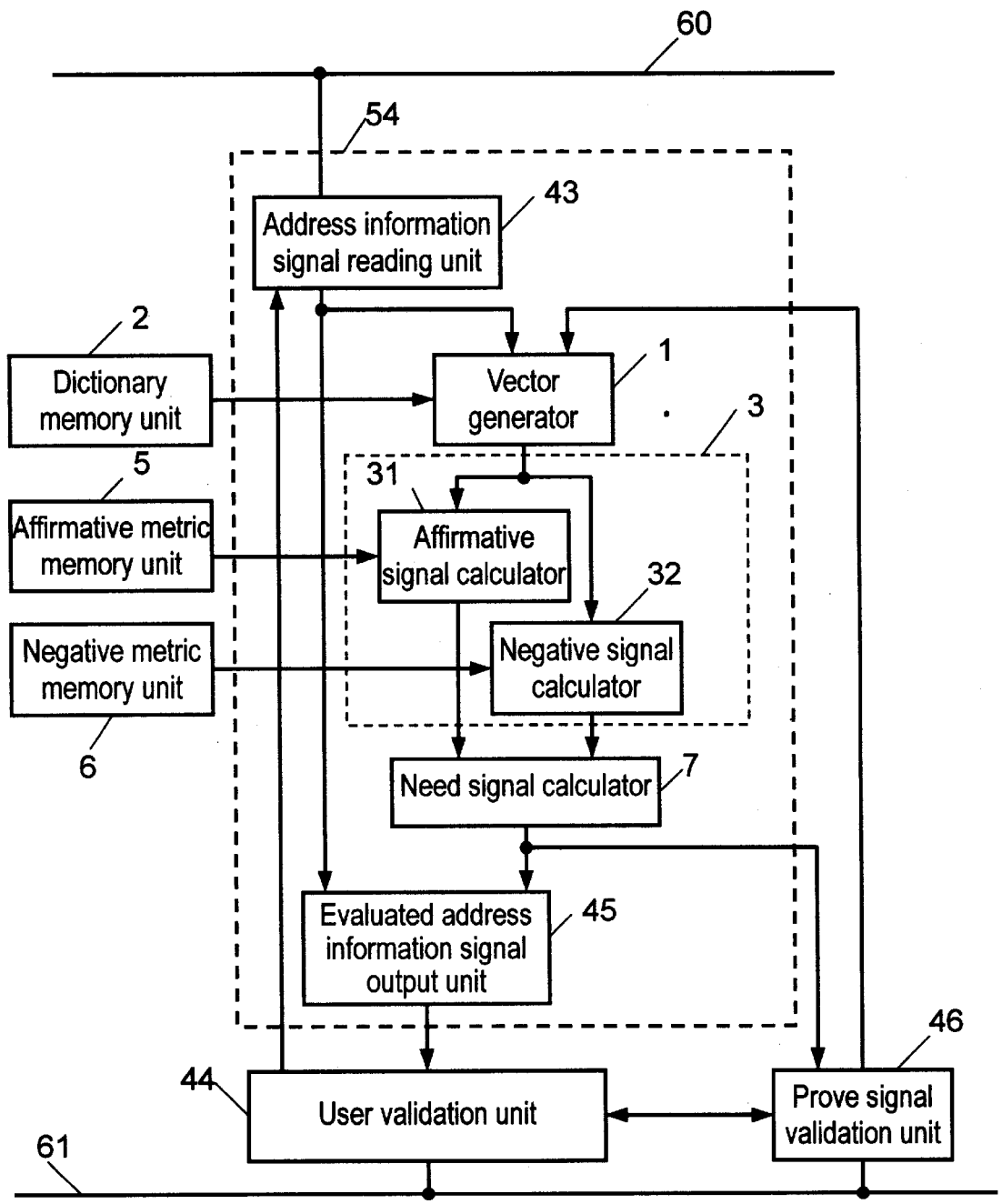
FIG. 6 is a block diagram of an information evaluation unit in the information inquiry support apparatus in embodiment 1 of the invention.

The basic concept of information inquiry support apparatus of the invention is to store the history of what kind of "information" needed by the user in the past, in the information filter adaptive to the user's concern, and to find out which user is versed in specific information by comparing the inquired information with the stored history.

The information inquiry support apparatus of the invention is an applied form of the adaptive information filtering apparatus previously filed by the present applicant in Japanese Patent Application No. 9-308386. In this information filtering apparatus, on the basis of the history of what kind of "information" needed by the individual or group user in the past, it is intended to evaluate, select and present how much new information is needed by user, by means of need signal and reliability signal. By entering the inquiry information in the information filtering apparatus, the degree of necessity of plural users about this input "information" is found, and the user of high degree of necessity is estimated to be versed in this "information", and this means, called probe signal monitor unit, is added, and the information inquiry support apparatus of the invention is realized.

Herein, "information" means one or more key words expressing its content are added to the pertinent "information". The key word may be part or whole of each word composing this "information", or may be particularly given for representing this "information", it may be a logical expression of classification code such as IPC or plural key words.

Hereinafter, "information" is composed of article signal D which is the main body of the information, and article profile DP which is a signal including the key word or the like characterizing the article signal D (formula 1), and the article profile includes the title TTL of "information", number of key words nofKs, and key words K[1], ..., K[nofKs] (formula 2).

$$\text{"information"}=(D, DP) \tag{1}$$

$$DP=(TTL, K(i):i=1{\sim}nofKs) \tag{2}$$

(Embodiment 1)

Embodiment 1 of the invention is described below while referring to a block diagram in FIG. 1.

FIG. 1 shows an example of the apparatus having plural adaptive type group information filter units 56, 57, 58, and 59 adaptive to the degree of necessity of the individual user and/or group user about the information. Supposing one user uses one adaptive type group information filter unit 56, first, the basic operation is explained below. Then, an information, evaluation unit 54 and a learning unit 52 included in the information filter unit 56 are explained. Later, the expanded operation of using plural information evaluation units by a group, and the characteristic operation of the information, that is, the inquiry of information using a probe signal monitor unit 70 are explained.

In the following explanation, it is supposed that the user registration into the adaptive type group information filter unit 56 (setting of user validation number in user validation unit 44) has been already finished by the manipulation by the system manager or by the user's own registration in the registration unit.

The basic operation is described below.

When "information" is entered in this apparatus, an information write unit 40 writes the "information" at address A in an information memory unit 41, and also writes an address article profile signal ADP (formula 3) composed of the address A and article profile DP (see formula 2) of the "information" into an address information signal memory unit 42.

$$ADP=(A, DP) \tag{3}$$

As the writing method of "information" into the information memory unit 41 and address information signal memory unit 42, it is preferred to store a batch of entered "information" (for example, in the unit of one day, several hours, several days) in one unit (for example, one file). Hereinafter, a file collecting plural address article profile signals ADP is called an address file.

Using an input device (not shown), the user starts up the group interface unit 55, and transmits the validation signal UIDPWD=(UID, PWD) composed of user name UID and pass word PWD to the adaptive type group information filter unit 56 through the network 61.

Receiving the validation signal UIDPWD, the adaptive type group information filter unit 56 returns the access permit or reject signal PA (formula 4) composed of information evaluation unit access permit or reject signal PA54 showing status of approval of access to the information evaluation unit 54 to the user and access permit or reject signal PA13 of teacher signal memory unit showing the status of approval of access to the teacher signal memory unit 13, to the group interface unit 55.

$$PA=(IFID, PA54, PA13) \tag{4}$$

where IFID is the unit identification number of the adaptive type group information filter unit.

Receiving the access permit or reject signal PA, the group interface unit 55 starts up the information evaluation unit 54.

The information evaluation unit 54 reads out the address file specified by the user or set as default, from the address information signal memory unit 42 through the network 60. A preferred example of default setting is the address file collecting the information distributed on the latest day. Further, the information evaluation unit 54 reads out the record (hereinafter called profile, the detail given later)

showing the user needed the "information" provided with which article profile DP in the past, from the memory units 2, 5, 6, and calculates the need signal N showing the necessity of "information" corresponding to the address article profile signal ADP and the reliability signal R showing the reliability of the need signal N. The calculating methods of need signal N and reliability signal R are given later.

An evaluated information signal NRADP (formula 5), which is a signal summing up the address article profile signal ADP, necessity signal N, and reliability signal R, is replied to the group interface unit 55.

$$NRADP=(N, R, A, DP) \quad (5)$$

The group interface unit 55 arranges the evaluated information signals NRADP sequentially from the larger need signal N, and displays in a display unit (not shown). FIG. 3 shows an example of a preferred display. The lower table in FIG. 3 shows the value of need signal N, input button whether or not to learn, and article title from the left column of each line.

The learning method is described below.

FIG. 2 shows an example of display not learning the necessity of the user.

Since the adaptive group information filter unit 56 has not learned the user necessity yet, the need signal N of all "information" items is 0.

Clicking the title on the display, the group interface unit 55 reads the "information" stored in the information memory unit 41, and displays on the screen.

The user reads the displayed "information", and clicks the Yes button of the corresponding line if this "information" is necessary, or clicks the No button if not necessary. This user's reply is called teacher signal T, and the value of this teacher signal T is T=1 when the Yes button is pressed, and T=0 when the No button is pressed, and in other case (for example, if not specified, or there is no data), T=−1.

The group interface unit 55 transmits the teacher data signal TD, which is a set of teacher signal T and article profile DP, to the adaptive type group information filter unit 56. The user validation unit 44 in the adaptive type group information filter unit 56 writes the received teacher data signal TD into the teacher signal memory unit 13.

By this operation, the teacher data signal TD is accumulated in the teacher signal memory unit 13.

When the user clicks the learn button (see FIG. 2) on the display of the group interface unit 55, a learn start signal LS is transmitted to the learning unit 52 through the user validation unit 44. Receiving the learn signal, the learning unit 52 rewrites the history content (profile) in the memory units 2, 5, 6 by the learning action described below, by using the teacher data signal TD accumulated and stored in the teacher signal memory unit 13. As a result, for example, the display order of "information" in FIG. 2 is changed to the order of need signal N as shown in FIG. 3.

The user's input of teacher signal is executed for enhancing the learning capability of the learning unit 52, and it is not necessary if the learning capability (the learning capability of the history showing the user needed what kind of "information" in the past) of the learning unit 52 is already sufficiently high.

The operation of the information evaluation unit 54 is described below.

First is described the concept of calculation of need signal showing how much the user needs a specific "information". If the "information" is provided with plural key words, they may be classified into a key word set A frequently or with high probability attached to the "information" needed by the user, a key word set B attached frequently or with high probability to the "information" not needed, and a key word set C attached to either or neither.

Key words belonging to the key word set A are assigned with positive numerical values, key words belonging to the key word set B are assigned with negative numerical values, and key words belonging to the key word set C are assigned with 0. Values are determined and integrated from one or more key words attached to the newly entered "information".

In the information needed by the user, it is highly possible that many key words belonging to the key word set A are contained, and the integrated value shows a large positive value. On the other hand, in the information not needed by the user, it is highly possible that many key words belonging to the key word set B are contained, and the integrated value is a large negative value. In this way, using the integrated value, the necessity of the user can be predicted.

In the invention, learning the presented "information" and evaluation of need or no need of user about this "information", the values are automatically assigned to key words (including key word coocurrence), and calculation of need signal at high precision is realized, and the "information" items are rearranged adequately in the sequence of necessity.

The procedure of calculation of the need signal is described. Plural key words attached to the "information" are converted into one vector V. When the user needs and when does not need, respectively, lengths SY, SN of vector V are calculated as in the following formula in terms of autocorrelation matrices MY, MN.

$$SY = \sum_i \sum_j MY_{ij} \cdot V_i \cdot V_j \quad (6)$$

$$SN = \sum_i \sum_j MN_{ij} \cdot V_i \cdot V_j$$

In the following explanation, the autocorrelation matrix MY created from the key word about needed "information" is called an affirmative metric signal, and the autocorrelation matrix MN created from the key word about non-needed "information" is called a negative metric signal, and the lengths SY, SN are respectively called an affirmative score signal and a negative score signal. This length SY is a large positive value when key words often contained in the "information" needed by the user are contained a lot in the plural key words from which the vector V is produced, and is close to 0 otherwise, and it is effective for calculating the need signal.

It is further described below by referring to the detailed block diagram of the information evaluation unit 54 in FIG. 6.

Code dictionary signals DCK for converting character string W such as key words attached to the "information" into numeral C are stored by nofDCK pieces in a dictionary memory unit 2 (formula 7).

$$DCK[1]=(W[1], C[1])$$

.

.

.

$$DCK[nofDCK]=(W[nofDCK], C[nofDCK]) \quad (7)$$

When the group interface unit 55 is started by the user, the group interface unit 55 sends an address information read start signal RS to an address information signal read unit 43 through the network 61. The address information read unit 43 reads out an address file compiling plural address article profile signals ADP (see formula 3), specified by the user or by default setting, and sends to the vector generator 1 and evaluated address information signal output unit 45.

The article profile signal DP (see formula 2) of each address article profile signal ADP of the file being read out is sequentially processed as follows. The key word number signal nofks and key word group signal Ks of article profile signal DP are fed into the vector generator 1, and the key word group signal Ks which is a group of character strings of each key word is converted into a vector signal V while referring to the dictionary signal as described below. By this conversion, similarity of key word group signal can be calculated as the distance between vectors.

Figure 7:
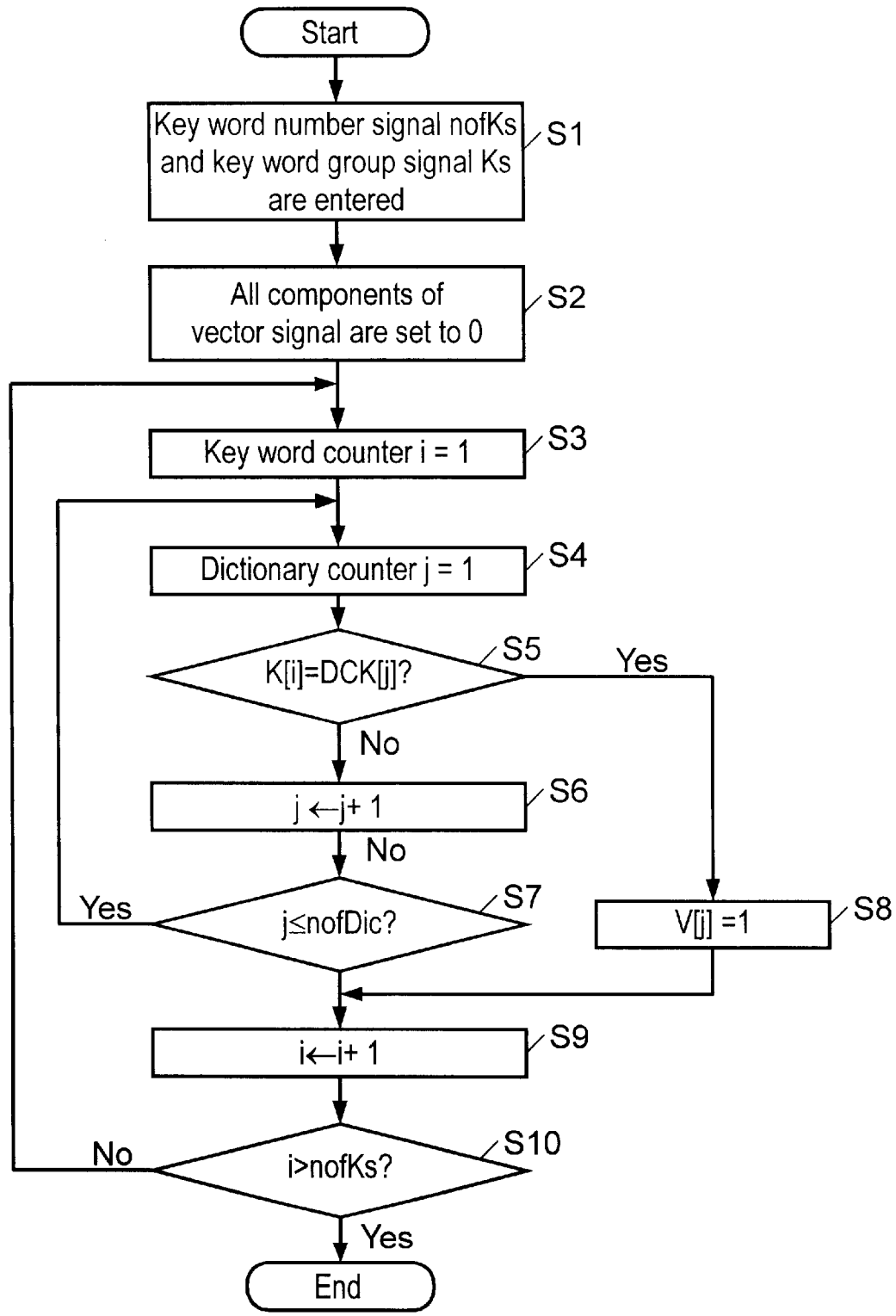
FIG. 7 is a flowchart of vector generator in the information evaluation unit in the information inquiry support apparatus in embodiment 1 of the invention.

The operation of the vector generator 1 is described in detail below while referring to the flow chart shown in FIG. 7. When key word number signal nofKs and keyword group signal Ks are entered (step S1 in FIG. 7), the internal vector signal V=(V[1], V[2], ..., V[nofDiC]) is set to (0, 0, ..., 0), and the key word counter signal i is set to 1 (steps S2, S3). The dictionary counter signal j is set to 0, and the dictionary counter signal j is increased by 1 (step S4).

The code dictionary signal DCK[j] (see formula 2) specified by the dictionary counter j is read out from the dictionary memory unit 2, and the character string portion W[j] of the code dictionary signal DCK[j] and the i-th key word signal K[i] are compared (step S5). If the both are not equal, the dictionary counter j is increased by 1 (step S6). The process of steps S5 to S7 is repeated until the both are matched or the value of the dictionary counter j is equal to the number nofDiC of code dictionary signals stored in the dictionary memory unit 2 (step S7).

When W[j] equal to the key word signal K [i] is discovered, the j-th component V[j] of the vector signal is set to 1 (step S8), and the key word counter signal i is increased by 1 (step S9). Hereinafter, the same process is repeated until the key word counter signal i becomes larger than the key word umber signal nofKs (step S10).

Thus, in the vector generator 1, the key word group signal Ks which is a set of key word signals composed of character string signals is converted into the vector signal V having nofDCK pieces of components coded by 0 and 1.

An affirmative signal calculator 31 receives the vector signal V, reads out an affirmative metric signal MY from the affirmative metric memory unit 5, and calculates the affirmative score signal SY according to formula 8. This affirmative score signal SY is a large value when many keywords included in the information needed by the user in the past are contained in the key word group signal Ks.

$$SY = \sum_{i=0}^{nofDIC-1} \sum_{j=0}^{nofDIC-1} MY[i][j] \cdot V[i] \cdot V[j] \tag{8}$$

Similarly, a negative signal calculator 32 reads out a negative metric signal MN from the negative metric memory unit 6, and calculates the negative score signal SN according to formula 9. This negative score signal SN is a large value when many keywords included in the information not needed by the user in the past are contained in the key word group signal Ks.

$$SN = \sum_{i=0}^{nofDIC-1} \sum_{j=0}^{nofDIC-1} MN[i][j] \cdot V[i] \cdot V[j] \tag{9}$$

The affirmative metric signal MY and negative metric signal MN are determined by learning the key word group signal Ks and user response as described below.

When a learning start signal LS is entered in the learning controller 14 from the group interface unit 55 through the network 61, the learning controller 14 instructs start of learning to the metric learning unit 19. The metric learning unit 19 reads out teacher data TD from the teacher signal memory unit 13, and converts the key word group signal Ks into vector LV, in learning vector generator 20 having the same function as the vector generator 1 of the information evaluation unit 54 (FIG. 6). Calculating the autocorrelation matrix of this vector LV, the affirmative metric signal MY stored in the affirmative metric memory unit 5 and the negative metric signal MN stored in the negative metric memory unit 6 are revised. By using the both metric signals, the affirmative score signal SY and the negative score signal SN are revised.

Figure 8:
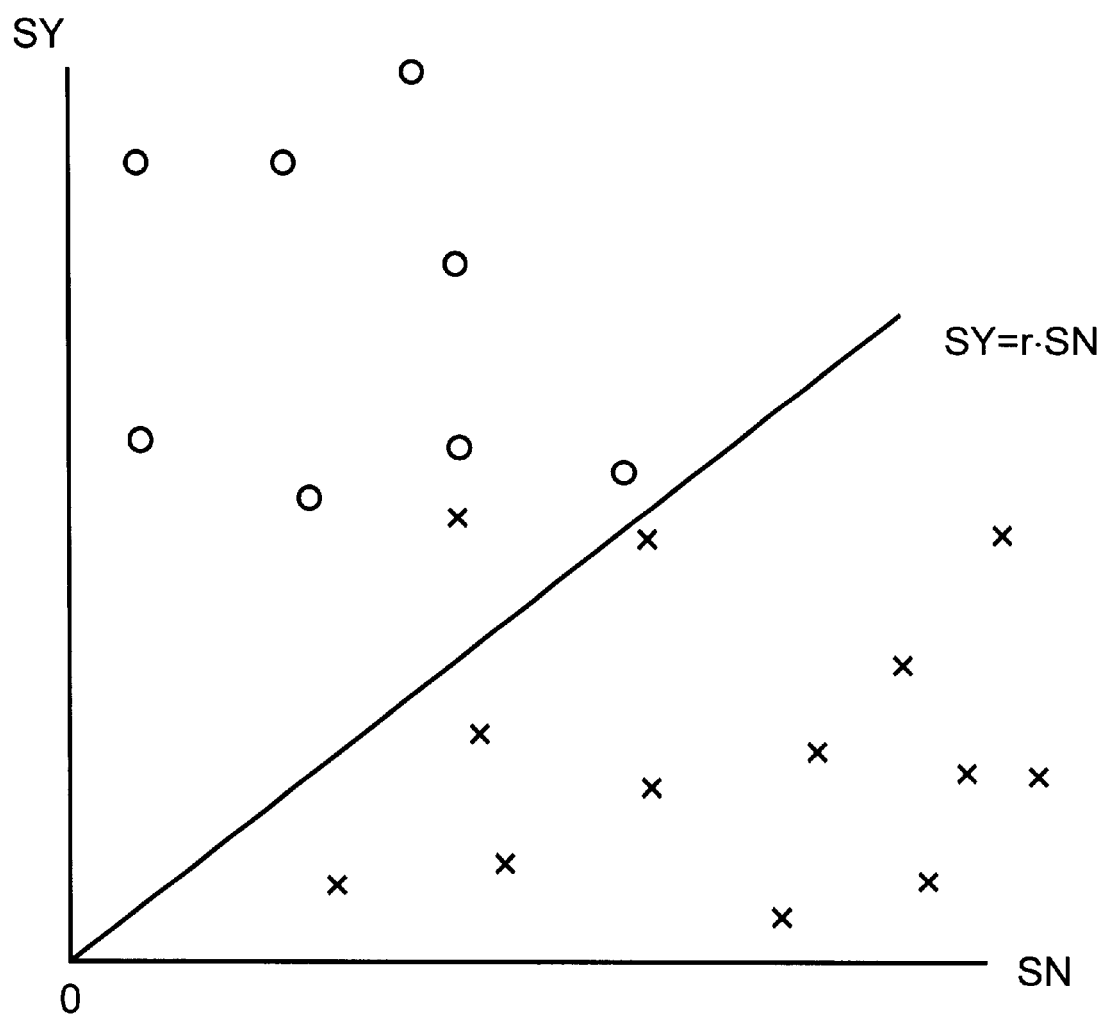
FIG. 8 shows a plotting example of affirmative score signal SY and negative score signal SN of a plurality of information on a plane in embodiment 1 of the invention.

FIG. 8 shows a two-dimensional plotting of a plurality of points corresponding to affirmative score signal SY and negative score signal SN of the address article profile signal (or each "information"), with the affirmative score signal SY on the vertical axis and negative score signal SN on the horizontal axis. That is, those needed by the user (indicated by ○) are mainly distributed in the upper left area, and others not needed by the user (indicated by X) are mainly distributed in the lower right area. Therefore, by setting a proper straight line (formula 10) as shown in FIG. 8, the article signal D needed by the user and the article signal D not needed can be separated.

$$SY = r \cdot SN \tag{10}$$

where r is a constant expressing the inclination of the straight line.

Therefore, supposing the need signal N to be SY−SN (formula 11), the information needed by the user has a large value.

$$N = SY - SN \tag{11}$$

In this embodiment, the inclination (r) is 1, but it may be other value as far as ○ and X can be clearly distinguished in FIG. 8.

Further, the need signal N described below has a larger value when positioned in the upper left area in the two-dimensional space, that is, in the case of the article signal D predicted to be high in necessity. Therefore, by arranging and presenting the article signals D in the sequence from higher need signal N, the user can acquire the necessary information efficiently. The reliability signal R (formula 12) in the direction orthogonal to the need signal N is, roughly speaking, a signal showing how many key word signals are included in the dictionary out of the key words contained in the key word group signal Ks. Therefore, the magnitude of this reliability signal R represents the degree of reliability of the need signal N calculated by the information filter.

$$R = SY + SN \tag{12}$$

For this purpose, the need calculator 7 receives the affirmative score signal SY issued from the affirmative signal calculator 31 and the negative score signal SN issued from the negative signal calculator 32, and calculates the need signal N (formula 11) which is a large value, as mentioned above, when there are many key words in the information needed in the past and there is almost no key word in the non-needed information, and the reliability signal R (formula 12), and sends them to an evaluated address information signal output unit 45.

The evaluated address information signal output unit 45 receives the address information signal ADP from the address information signal read unit 43 and the need signal N and reliability signal R from the need signal calculator 7, and issues an evaluated information signal NRADP. Thus, the information evaluation unit 54 reads in the address article profile signal ADP, and issues the evaluated information signal NRADP.

An outline of operation of the learning unit 52 is described below while referring to a block diagram in FIG. 9.

When a learning start signal LS is entered in the learning controller 14 from the group interface unit 55 through the network 61, the learning controller 14 instructs start of learning to the metric learning unit 19. The metric learning unit 19 reads out teacher data TD from the teacher signal memory unit 13, and converts the key word group signal Ks into vector LV, in learning vector generator 20 having the same function as the vector generator 1 of the information evaluation unit 54 (FIG. 6). Calculating the autocorrelation matrix of this vector LV, the affirmative metric signal MN stored in the affirmative metric memory unit 5 and the negative metric signal MN stored in the negative metric memory unit 6 are revised. By using the both metric signals, the affirmative score signal SY and the negative score signal SN are revised.

Figure 10:
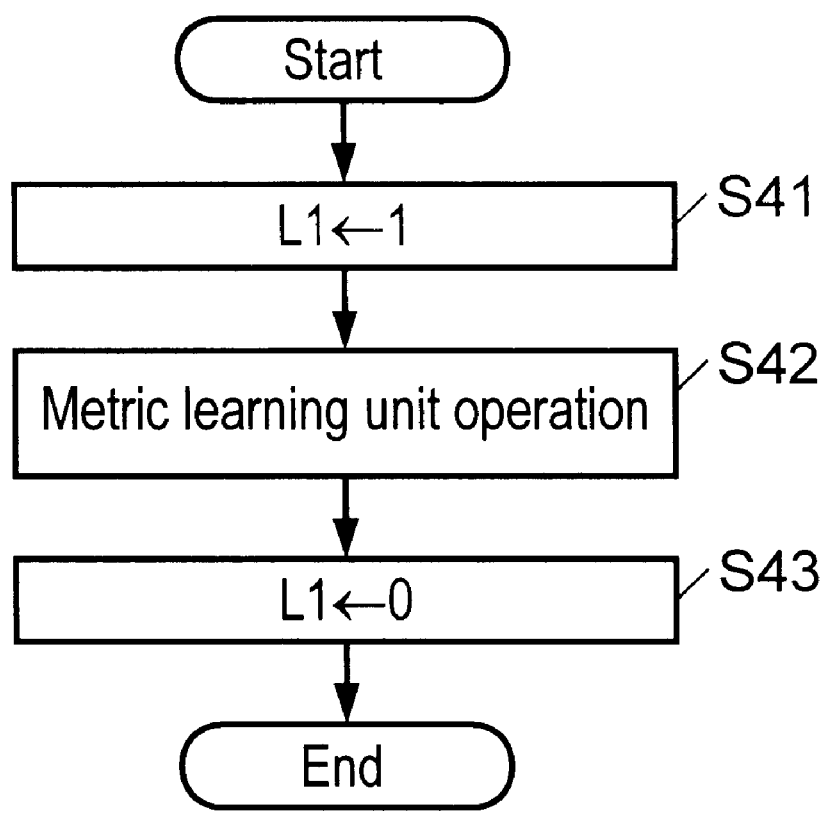
FIG. 10 is a flowchart of operation of learning controller in the learning unit in the information inquiry support apparatus in embodiment 1 of the invention.

The operation of the learning unit 52 is described by referring to the flowchart in FIG. 10. When the learning start signal LS is entered in the learning controller 14 from the group interface unit 55 through the network 61, the learning controller 14 changes the instruction signal LI from 0 indicating waiting state to 1 indicating processing state (step S41 in FIG. 10), starts the metric learning unit 19 (step S42) while returning it to the group interface unit 55, and when the learning process is over, the value of the instruction signal LI of the learning controller 14 is returned to 0 indicating waiting state, and is sent to the group interface unit 55 (step S43), and the process is terminated.

Figure 11:
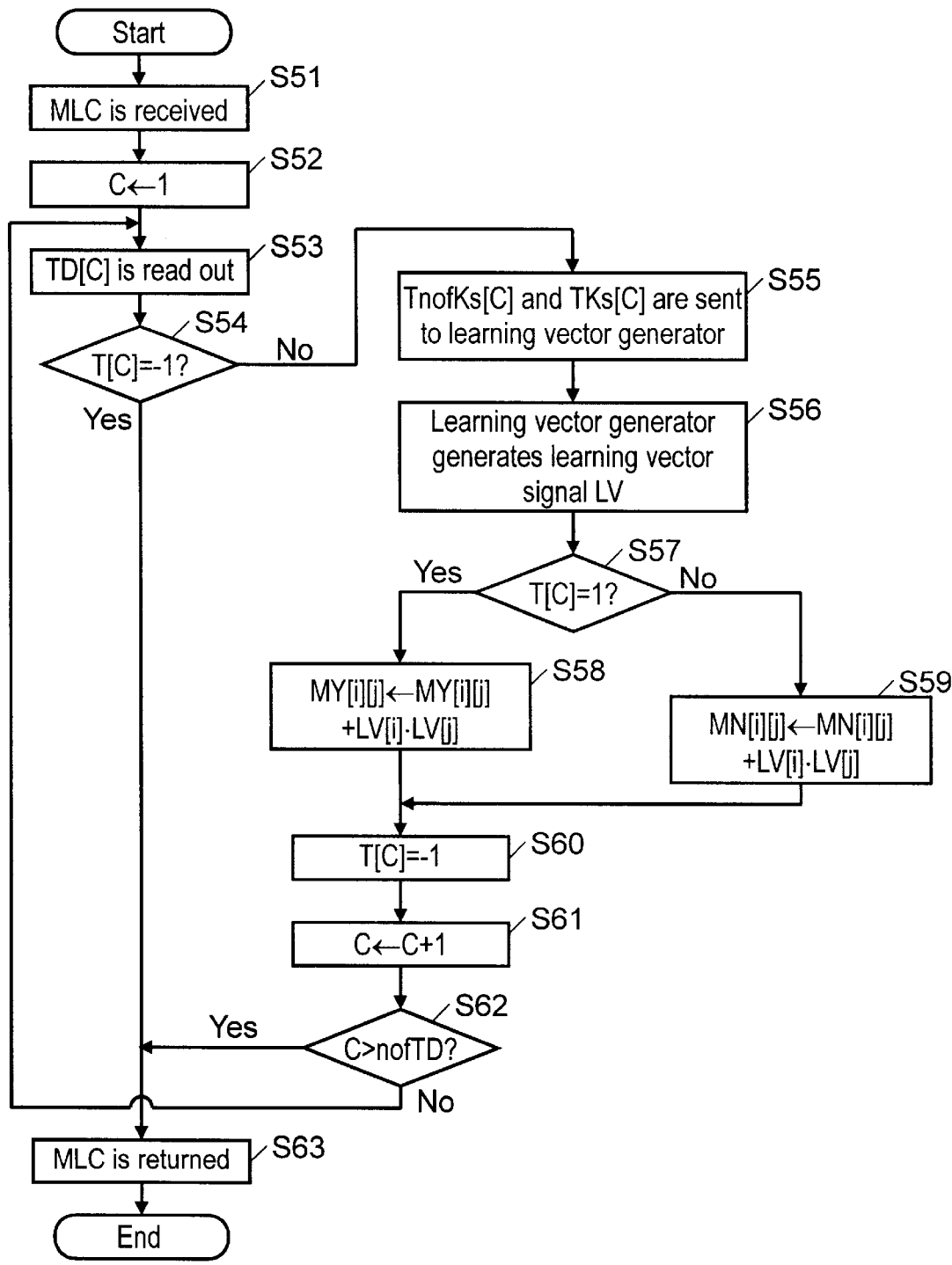
FIG. 11 is a flowchart of operation of metric learning block in the learning unit in the information inquiry support apparatus in embodiment 1 of the invention.

The operation of the metric learning unit 19 is described by referring to the flowchart in FIG. 11. The metric learning unit 19, when receiving a metric learning control signal MLC from the learning controller 14 (step S51 in FIG. 11), reads out the affirmative metric signal MY from the affirmative metric memory unit 5 and negative metric signal MN from the negative metric memory unit 6, and sets the value of the teacher data counter c to 1 (step S52).

Consequently, the metric learning unit 19 reads out the c-th teacher data signal TD[c] (formula 13) from the teacher data memory unit 13 (step S53).

$$TD[c]=(T[c],DP[c])=(T[c],TTL[c],nofKs[c],Ks[c]) \tag{13}$$

Investigating the teacher signal T[c] of the teacher data TD[c] (step S54), if the teacher signal T[c] is not −1, the key word number signal nofKs[c] and key word group signal Ks[c] of the teacher data TD[c] are issued to the learning vector generator 20 (step S55). The learning vector generator 20, like the vector generator 1 of the information evaluation unit 54, converts the key word group signal Ks[c] into learning vector signal LV, and issues to the metric learning unit 19 (step S56). The metric learning unit 19, if the teacher signal T[c] of the teacher data TD[c] is T=1 (that is, the user needs this information) (step S57), corrects the affirmative metric signal MY as in formula 14 (step S58).

$$MY[i][j]=MY[i][j]+LV[i] \cdot LV[j] \tag{14}$$

where i, j=1 to nofDIC.

If the teacher signal T[c] of the teacher data TD[c] is 0 (that is, the user does not need this information) (step S57), the negative metric signal MN is corrected as in formula 15 (step S59).

$$MN[i][j]=MN[i][j]+LV[i] \cdot LV[j] \tag{15}$$

where i, j=1 to nofDiC.

After correcting the affirmative metric signal or negative metric signal, the teacher signal T[c] is reset to −1 (step S60).

Next, the value of the teacher data counter is increased by $$c=c+1$$

(step S61). Comparing the counter value (c) and the maximum value nofTD of the teacher data signal number that can be stored in the teacher signal memory unit 13 (step S62), if c>nofTD, the process goes to step S63, and otherwise the process returns to step S53.

The metric learning unit 19 repeats the same operation until the teacher signal T[c] of the teacher data TD[c] becomes T[c]=−1. At T[c]=−1, process of metric learning is terminated, and the metric learning control signal MLC is sent to the learning controller 14. Receiving the metric learning signal MLC, the learning controller 14 returns the instruction signal LI to 0 showing waiting state, and terminates the process.

By this process, elements of affirmative metric signal MY corresponding to plural key word signals attached to the article signal D needed by the user (hereinafter called necessary article signal D) come to have larger values, and hence the affirmative score signal SY becomes larger. On the other hand, elements of negative metric signal MN corresponding to plural key word signals attached to the article signal D not needed by the user (hereinafter called unnecessary article signal D) come to have larger values, and hence the negative score signal SN becomes larger. Thus, depending on the necessity of the user, the affirmative metric signal MY and the negative metric signal MN are obtained.

Comprising a plurality adaptive type group information filter units, an extended system is built up to be used by individual and group users, in which the operation is as described below. In this case, the group interface unit 55 includes plural input devices, plural display devices, and a control device for connecting a network with them.

The user using the adaptive type group information filter units 56 to 59 starts up the group interface unit 55, and enters the user name UID and pass word PWD. The group interface unit 55 transmits the validation signal UIDPWD (formula 16) consisting of the user name UID and pass word PWD to the plural adaptive type group information filter units 56 to 59 through the network 61.

$$UIDPWD=(UID, PWD) \tag{16}$$

Receiving the validation signal UIDPWD, the adaptive type group information filter units 56 to 59 return the access permit or reject signal PA (formula 17) composed of unit identification signal IFID for specifying the own unit, information evaluation unit access permit or reject signal PA54 showing the approval status of access to the own information evaluation unit 54 to the user, and teacher signal memory unit access permit or reject signal PA13 showing the approval status of access to the own teacher signal memory unit 13, to the group interface unit 55.

$$PA=(IFID, PA54, PA13) \quad (17)$$

Supposing four users, UA, UB, UC, UD, possess the right of use of the adaptive type group information filter units 56 to 59 respectively (unit identification signals being IF1, IF2, IF3, IF4), when UA and UB form a first group G1, and UC and UD form a second group G2, preferred setting of the access permit or reject signal PA is described.

When the user UA transmits the validation signal UID-PWD through the group interface unit 55, the four adaptive type group information filter units respectively return the following access permit or reject signals PA1 to PA4 (formula 18).

$$PA1=(IF1, \text{permit, permit})$$

$$PA2=(IF2, \text{permit, reject})$$

$$PA3=(IF3, \text{reject, reject})$$

$$PA4=(IF4, \text{reject, reject}) \quad (18)$$

These access permit or reject signals have the following meaning.

The adaptive type group information filter unit 56 (IF1) of which right of use is possessed by the user UA permits access of both information evaluation unit 54 and teacher signal memory unit 13 by access permit or reject signal PA1. As a result, the user UA can use the information evaluation unit 54 of the adaptive type group information filter unit 56 (IF1) and change the characteristic of the adaptive type group information filter unit 56 (IF1). In the adaptive type group information filter unit 56, the profile of the user UA can be created, learned and stored.

The adaptive type group information filter unit 57 (IF2) of which right of use is possessed by the user UB of the same group G1 permits access to the information evaluation unit but rejects access to the teacher signal memory unit by the access permit or reject signal PA2. As a result, the user UA can use the information evaluation unit of the adaptive type group information filter unit 57 (IF2) but cannot change the characteristic of the adaptive type group information filter unit 57 (IF2).

The adaptive type group information filter units 58 (IF3) and 59 (IF4) of which right of use is possessed by users UC and UD of a different group G2 reject access to both information evaluation unit and teacher signal memory unit by the access permit or reject signals PA3 and PA4. As a result, the user UA cannot use the information evaluation unit of the adaptive type group information filter units 58 (IF3), 59 (IF4), and cannot change the characteristic of the adaptive type group information filter units 58 (IF3), 59 (IF4).

As shown in this example, the group interface unit 55 receiving the access permit or reject signal PA opens a communication line between the adaptive type group information filter units 56 (IF1) and 57 (IF2) permitted by the PA54, starts up each information evaluation unit, and reads out the address file specified by the user UA or set as default through the information evaluation unit.

On the other hand, the users UB, UC and UD create each profile different from that of the user UA, in the corresponding adaptive type group information filter units 57 to 59.

When the user UA clicks the group filter button for requesting group evaluation, and the group filter shown in FIG. 5 is ON, and the access button to the file collecting the evaluated information signals of two days before (October 4), the operation is described below. FIG. 4 shows a display example of accessing the same file by the user UA clicking the individual filter button.

The group interface unit 55, concerning 13 cases of "information" entered on Oct. 4, 1997, receives evaluated information signals IF1-NRADP-971004-001 to IF1-NRADP-971004-013 evaluated by the necessity of the user UA, from the adaptive type group information filter unit 56, and also receives evaluated information signals IF2-NRADP-971004-001 to IF2-NRADP-71004-013 evaluated by the necessity of the user UB of the same group as the user UA, from the adaptive type group information filter unit 57. The group interface unit 55 calculates the sum of two need signals corresponding to the "information" same in the article number in the lower three digits of the evaluated information signals, as the need signal of the group G1 of users UA and UB.

As shown in FIG. 5, the group interface unit 55 displays the "information" by arranging in the sequence of signals of higher group need signal. In the case of FIG. 5, in addition to five papers needed by the user UA (in the example in FIG. 4, need signal N≧0.5), there are three more papers needed as the group (in the example in FIG. 5, need signal N≧0.5).

Thus, by using the group information filter, the user UA can review the "information" necessary in the group to which one belongs by priority (in the higher positions of the list). Although important for the group, if the "information" individually overlooked by the user UA is noticed by the user UB of the same group, by using the group information filter, the overlooked "information" is displayed in the higher positions of the list. Therefore, by using the group information filter, the user UA can prevent overlooking of "information".

Next, as a primary aspect of the invention, a method of searching a person interested in a specific article, that is, a person estimated to versed in a specific field is explained below while referring to block diagrams in FIG. 1 and FIG. 6, and flowchart in FIG. 14. The article to be inquired is supposed to be inquiry article signal TDS, and the signal characterizing this article is called inquiry article profile TDP. In a preferred embodiment, the inquiry article signal TDS and inquiry article profile TDP are in the same format (formula 19) as the article signal D (formula 1) and article profile DP (formula 2).

Inquiry article=(TDS, TDP)

$$TDP=(TTL, K(i):i=1\sim nofKs) \quad (19)$$

When the user inquiring the article signal TDS enters the inquiry article profile TDP, the group interface unit 55 transmits it to a probe signal monitor unit 70 through the network 61.

Figure 14:
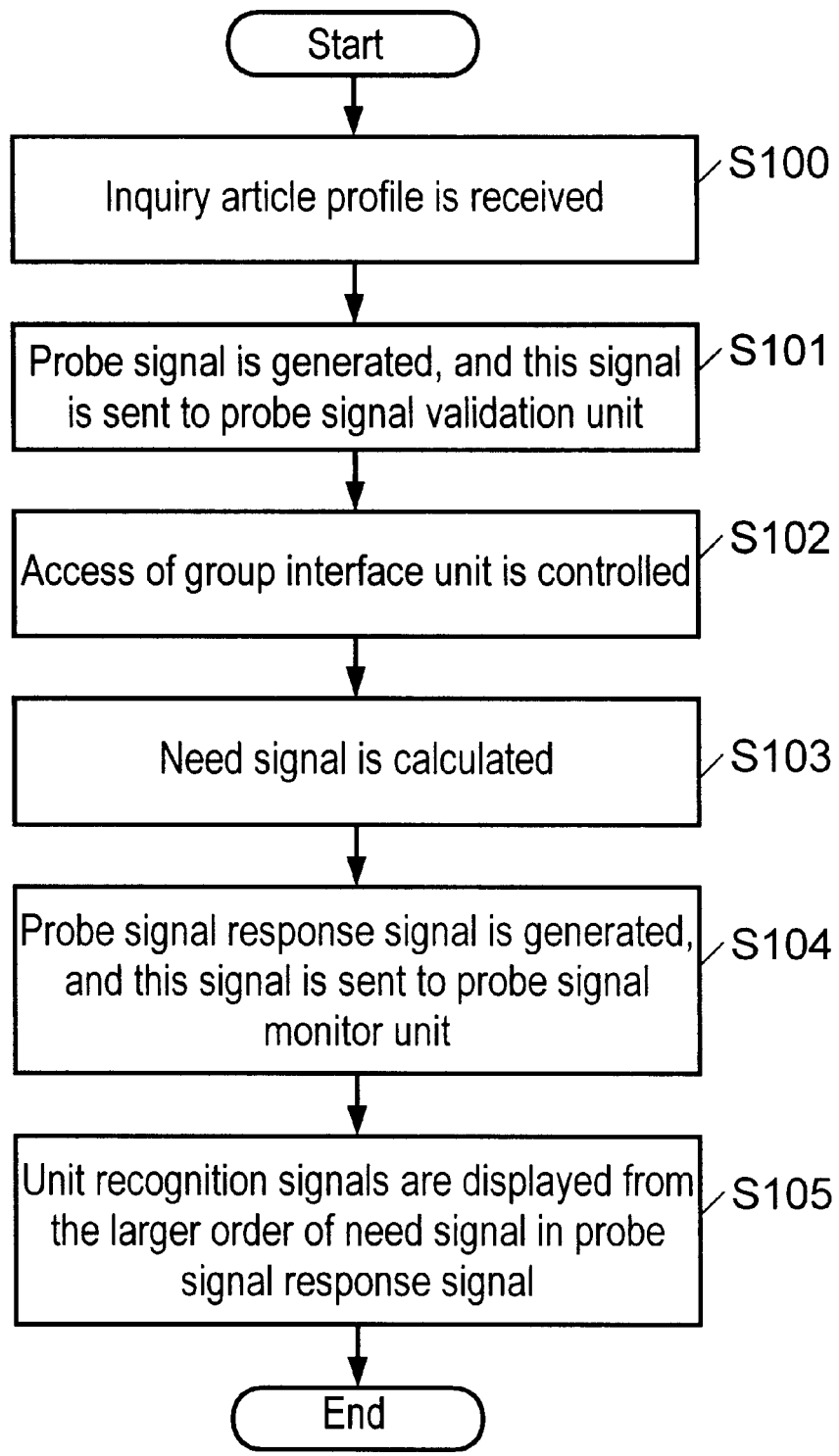
FIG. 14 is a flowchart of operation of probe signal monitor unit in an information inquiry support apparatus in embodiment 3 of the invention.

The probe signal monitor unit 70, receiving the inquiry article profile TDP (step S100 in FIG. 14), creates a probe signal (formula 20) by adding flag PF showing probe signal to the inquiry article profile TDP, and transmits it to each probe signal validation unit 46 in the plural adaptive type group information filter units 56 to 59 through the network 61 (step S101 in FIG. 14).

$$PS=(PF, TDP) \quad (20)$$

In the plural adaptive type group information filter units 56 to 59, the following operations are executed parallel. The operation of the adaptive type group information filter unit 56 is described below as a representative example.

Receiving the probe signal PS, the probe signal validation unit 46 transmits the probe signal reception signal PSRS to the user validation unit 44, and the user validation unit 44 set so as not to accept the access from the network 61 (step S102).

Next, the probe signal validation unit 46 transmits the key word number signal nofKs and key word group signal Ks of the probe signal PS, to the vector generator 1. Hereinafter, the same calculations (formula 3, formula 4) as performed in the stored information mentioned above are carried out, and the need signal N (formula 11) is issued from the need signal calculator 7, and the need signal N is transmitted to the probe signal validation unit 46 (step S103).

Receiving the need signal N, the probe signal validation unit 46 sends the need signal reception signal NRS to the user validation unit 44, and the user validation unit 44 sets so as to accept the access from the network 61 again. The probe validation unit 46 reads the unit identification signal IFID (including user name and others as required) from the user validation unit 44, and transmits the probe response signal PRS (formula 21) composed of the unit identification signal IFID and need signal N to the probe signal monitor unit 70 (step S104).

$$PRS=(IFID, N) \qquad (21)$$

The probe signal monitor unit 70, when receiving probe response signals PRS from the plural adaptive type group information filter units 56 to 59 and all probe response signals PRS are ready, transfers them to the group interface unit 55 through the network 61. In the group interface unit 55, the plural probe response signals PRS are displayed on the monitor by arranging in the sequence of larger need signals N contained therein (step S105).

By this operation, the unit identification signal IFID of the user interested in the inquiry article signal TDS is displayed in the higher position. Therefore, when the unit identification signal IFID is set by including the owner name and mail address, by entering the inquiry article profile TDP, the inquiring user can acquire the address of the user interested in the inquiry article signal TD, that is, the user estimated to be versed in the specific information as the inquiry destinations.

Incidentally, by using the average (included weighted average) of the need signals N of the members of the group, the group may be also included as the inquiry destinations.

Thus, according to the information inquiry support apparatus in embodiment 1 of the invention, by learning on the basis of the teacher signal from the user, not only the "information" needed by the user is presented by priority, but also the individual and/or group user having particular knowledge about the inquiry information (having strong concern or necessity) can be found out by adding the probe signal monitor unit to the adaptive type group information filter capable of obtaining the "information" needed by the entire group efficiently by making use of the knowledge of the users belonging to a same group.

(Embodiment 2)

Embodiment 2 of the invention is described in detail below.

Embodiment 2 of the invention relates to an apparatus and method of improvement, that is, a code dictionary signal DCK stored in a dictionary memory unit 2 is updated so as to be adaptive to the user when learning teacher data, and an affirmative metric signal MY and a negative metric signal MN stored respectively in an affirmative metric memory unit 5 and a negative metric memory unit 6 are updated from the autocorrelation matrix corresponding to the frequency of appearance of key words to the autocorrelation matrix in consideration of the probability distribution of key words depending on probability of necessity and non-necessity of information.

Figure 9:
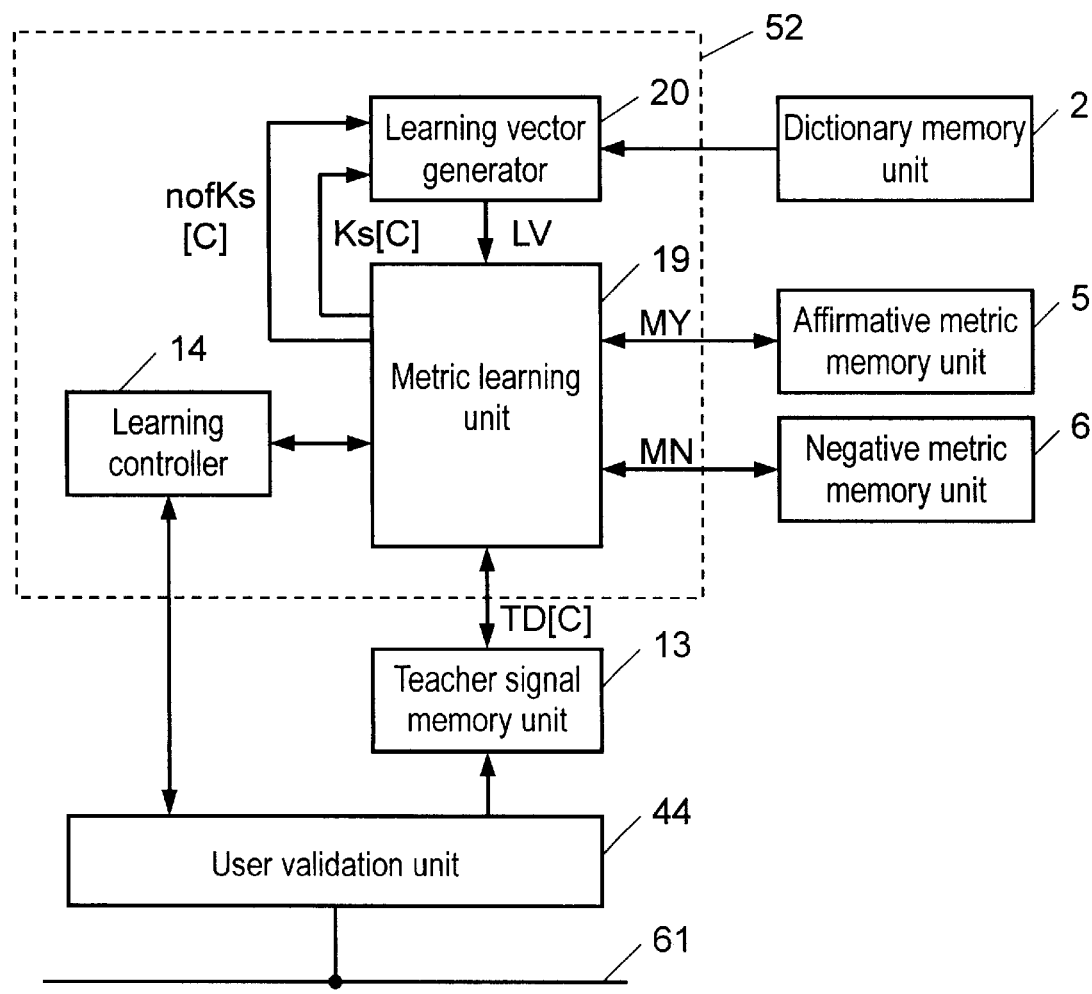
FIG. 9 is a block diagram of learning unit in the information inquiry support apparatus in embodiment 1 of the invention.
Figure 12:
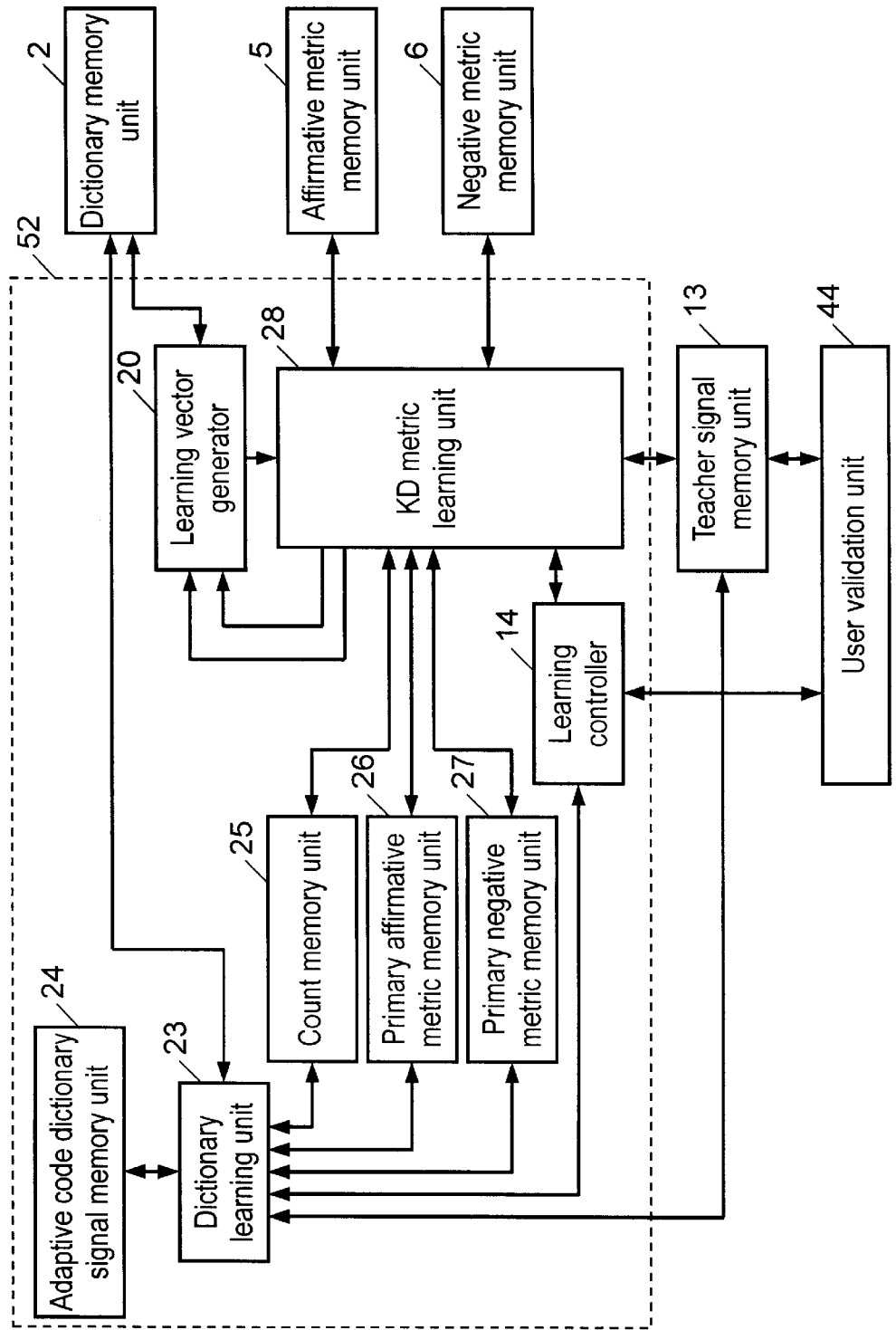
FIG. 12 is a block diagram of a learning unit in an information inquiry support apparatus in embodiment 2 of the invention.
Figure 13:
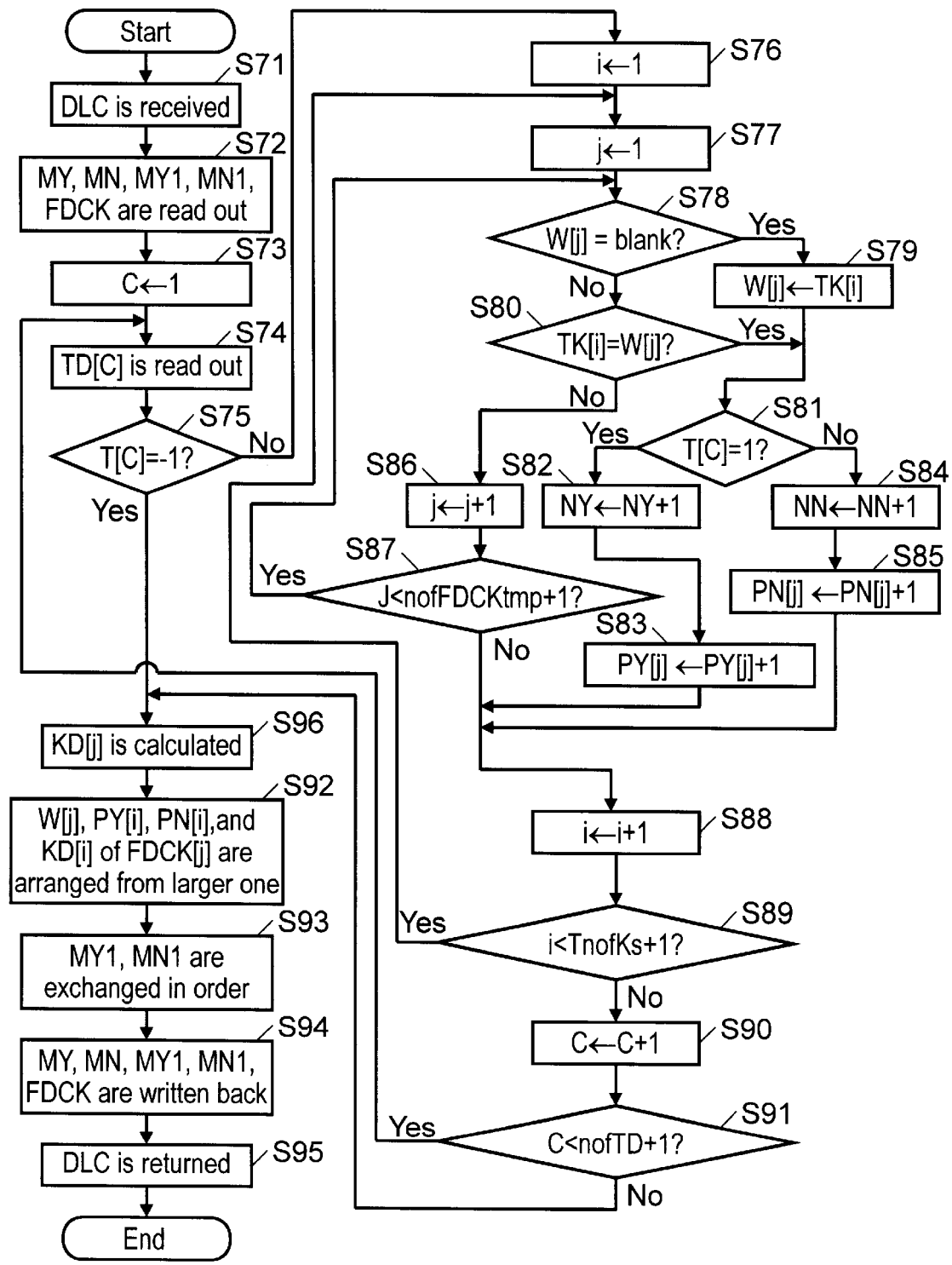
FIG. 13 is a flowchart of operation of dictionary learning block in the learning unit in the information inquiry support apparatus in embodiment 2 of the invention.

For this purpose, the learning unit 52 shown in FIG. 1 of embodiment 1 is replaced by the configuration shown in a block diagram in FIG. 9 to a block diagram in FIG. 12. It is described below while referring to the block diagram in FIG. 12 and a flowchart in FIG. 13. In FIG. 12, an adaptive code dictionary signal memory unit 24 stores a table (formula 22) having nofFDCK pieces of adaptive code dictionary signals FDCK[j], including character string W[j], numeral C[j], affirmative number PY[j] showing the number of necessary article signals D and negative number PN[j] showing the number of unnecessary article signals D of which the key word group signal Ks contains the character string W[j].

$$FDCK[1]=(W[1], C[1], PY[1], PN[1])$$
$$FDCK[j]=(W[j], C[j], PY[j], PN[j])$$
$$FDCK[nofFDCK]=(W[nofFDCK], C[nofFDCK],$$
$$PY[nofFDCK], PN[nofFDCK]) \qquad (22)$$

The operation of embodiment 2 is explained. The same operation as in embodiment 1 is omitted.

In an example of a preferred initial state of the adaptive type group information filter unit, the affirmative metric signal MY and negative metric signal MN are in (nofDCK× nofDCK) zero matrix, teacher signals T[j] of teacher data TD[j] of teacher data memory unit 13 are all −1, character strings W[j] of adaptive code dictionary signal FDCK[j] are all blank, numeral C[i]=i, affirmative number PY[j] and negative number PN[j] are all 0, and all character strings of the code dictionary of the dictionary memory unit 2 are all blank, corresponding to the adaptive code dictionary.

The information evaluation unit 54, evaluated information write unit 42, evaluated information memory unit 43, user validation unit 44, and group interface unit 55 operate same as in embodiment 1, and the teacher data TD having user response is stored in the teacher signal memory unit 13. When the learning start signal LS is entered into the learning controller 14 from the group interface unit 55 through the user validation unit 44, the learning controller 14 changes the learning controller instruction signal LI from 0 to 1 showing processing state, and returns to the user validation unit 44, and simultaneously sends the dictionary learning signal DLC to the dictionary learning unit 23.

Receiving the dictionary learning signal DLC from the learning controller 14 (step S71 in FIG. 13), the maximum number, nofFDCKtmp pieces, of the adaptive code signals FDCK limited by the size of the dictionary signal buffer are read out from the adaptive code dictionary memory unit 24, and read into the dictionary signal buffer, and the all affirmative number signal NY and all negative number signal NN are read out from the count memory unit 25, and the primary affirmative metric signal MY1 from the primary affirmative metric memory unit 26, and primary negative metric signal MN1 from the primary negative metric signal memory unit 27 (step S72). Setting the value of the internal teacher data counter c to 1 (step S73), the teacher data TD[c] is read out from the teacher signal memory unit 13 (step S74), and it is judged if the teacher signal T[c] is −1 or not (step S75).

In the case of T[c]≠−1 (that is, =1 or 0), the following process is carried out. First, setting the value of the internal key word number counter i to 1 (step S76), the value of the adaptive code dictionary counter j is set to 1 (step S77).

Judging if the character string W[j] is blank or not (step S78), if blank, the character string W[j] is replaced by the key word signal TK[i] (step S79). If not blank, the i-th key word signal TK[i] of the teacher data TD[c] and the character string W[j] of the j-th adaptive code dictionary signal FDCK(j) are compared (step S80).

When the character string W[j] is blank, or when it is not blank and the key word signal TK[i] and character string W[j] are matched, the following process is done depending on the value of T[c]. In the case of T[c]=1 (step S81), 1 is added to the all affirmative number signal NY (step S82); and 1 is added to the affirmative number PY[j] of the adaptive code dictionary signal FDCK[j] (step S83). In the case of T[c]≠1, that is, T[c]=0, 1 is added to all negative number signal NN (step S84), and 1 is added to the negative number PN[j] of the adaptive code dictionary signal FDCK [j] (step S85).

When the W[j] is not blank, and the key word signal TK[i] and character string W[j] are not matched, the value of the adaptive code dictionary counter j is increased by 1 (step S86). The value of the adaptive code dictionary counter j is compared with the value nofFDCKtmp+1 by adding 1 to the number of adaptive code signals that can be stored in the adaptive code dictionary signal buffer (step S87). When the value of the adaptive code dictionary counter j is smaller than nofFDCKtemp+1, the process returns to the step of judging if the character string W[j] is blank or not. Otherwise, the value of the key word counter i is increased by 1 (step S88).

When the value of the key word counter i is smaller as compared with the value, TnofKs+1, by adding 1 to the key word number signal TnofKS of the teacher data TD[c] (step S89), the dictionary counter j is set to 1, and the same processing is done. Otherwise, the value of the teacher data counter c is increased by 1 (step S90). The value of the teacher data counter c and the value nofTD+1 by adding 1 to the maximum value nofTD of the number of teacher data are compared (step S91), when the value of the teacher data counter c is smaller, the next teacher data TD[c] is read out, and the same process is done (step S74). When the value of the teacher data counter c is equal to nofTD+1 (step S91), it means the processing is finished on all teacher data TD.

The dictionary learning unit 23 calculates the key word cost signal KD about each adaptive code dictionary signal FDCK[j](step 96). This key word cost signal is a value used for judging the degree of effectiveness of the character string W[j] as the key word.

The concept of calculation of the key word cost signal KD and its formula are discussed. Comparing with the probability of appearance of necessary article signal $$Q=NY/(NY+NN)$$

the larger the probability of the article signal D provided with character string W[j] as key word to be necessary article signal $$PY[j]/(PY[j]+PN[j])$$

the more effective is the character string W[j] for judging that the article signal D is an necessary article signal. Similarly, comparing with the probability of appearance of article signal unnecessary for the user $$(1-Q)=NN/(NY+NN)$$

the larger the probability of the article signal D provided with character string W[j] as key word to be unnecessary article signal $$PN[j]/(PY[j]+PN[j])$$

the more effective is the character string W[j] for judging that the article signal D is a unnecessary article signal.

The key word cost signal KD may be any value as far as its nature is expressed, and one of the preferred examples is what is known as Kullback divergence (formula 23).

$$KD(j)=Q\cdot\log\;(PY[j]/(PY[j]+PN[j]))+(1-Q)\cdot\log\;(PN[j]/(PY[j]+PN[j])) \quad (23)$$

In this case, however, when the all affirmative number signal NY, all negative number signal NN, affirmative number PY[j], and negative number PN[j] are all 0 as in the initial state of this information filtering apparatus, and the denominator of the fraction is 0, and log cannot be calculated, or the key word cost signal of the adaptive code dictionary signal FDCK[j] for satisfying the relation $$PY[j]+PN[j]\approx 1$$

may be over-evaluated, and it is not adequate in these cases. One of the preferred embodiments for avoid such inconvenience is to transform the key word cost signal as in formula 24.

$$KD(j)=\tanh((PY[j]+PN[j])/PC)\cdot\tanh\{Q\cdot\log\;((PY[j]+\epsilon)/(PY[j]+PN[j]+2\epsilon))+(1-Q)\cdot\log\;((PN[j]+\epsilon)/(PY[j]+PN[j]+2\epsilon))\} \quad (24)$$

where ϵ is a parameter having a small positive value to avoid division with 0 and evade log0. When the parameter PC is a value of about 3 to 10, a preferred value of KD[j] will be obtained.

After calculation of KD[j], the character string W[j], affirmative number PY[j], and negative number PN[j] of the adaptive code dictionary signal FDCK[j] are arranged in the descending sequence of the key word cost signal KD[j] (step 92). At this time, the initial sequence is left over in the numerals C[j] of the adaptive code dictionary FDCK[j]. Making use of this, from the primary affirmative metric signal MY1 and C[j], elements of the primary affirmative metric signal MY1 is replaced as follows.

When both values of C[i] and C[j] are smaller than the number nofDCK of the code dictionary DCK, $$M[i][j]=MY1[C[i]][C[j]],$$

i, j=1, . . . nofDCK
Otherwise, in the case of i=j, supposing $$M[i][i]=PY[C[i]],\;i=1,\ldots nofDCK$$

In the case of i≠j, supposing $$M[i][j]=0,\;i\;j=1,\ldots nofDCK$$

then the primary affirmative metric signal MY1 is replaced as follows;

$$MY1[i][j]=M[i][j],\;i,\;j=1,\ldots nofDCK$$

Similarly elements of the primary negative metric signal MN1 is replaced (step S93).

Then, the numeral C[j] of the adaptive code dictionary FDCK[j] in the adaptive code dictionary signal buffer is replaced as $$C[j]=i,\;j=1,\ldots nofFCKtmp$$

After the above process, the dictionary learning unit 23 writes the higher nofDCK pieces of character strings W[j] and numerals C[j] of the adaptive code dictionary FDCK in the adaptive code dictionary buffer into the dictionary memory unit 2, writes higher nofFDCK pieces of adaptive code dictionary signals FDCK[j] in the adaptive code dictionary buffer into the adaptive code dictionary memory unit 24, writes all affirmative number signal NY and all negative number signal NN into the count memory unit 25, and writes the primary affirmative metric signal MY1 into the primary affirmative metric signal memory unit 26 and the primary negative metric signal MN1 into the primary negative metric signal memory unit 27 (step S94). Finally, returning the dictionary learning signal DCL to the learning controller 14 (step S95), the process is terminated.

The learning controller 14 sends the metric learning control signal MLC to the KD metric learning unit 28. Receiving the metric learning control signal MLC, the KD metric learning unit 28 reads out the primary affirmative metric signal MY1 from the primary affirmative metric memory unit 26, and the primary negative metric signal MN1 from the primary negative metric memory unit 27.

The KD metric learning unit 28 sets the value of the teacher data counter c to 1. From the teacher data memory unit 13, the c-th teacher data signal TD[c] is read out, and the teacher signal T[c] of the teacher data TD[c] is investigated. When the teacher signal T[c] is not $-1$, (T$\neq -1$), the key word number signal nofKs[c] and key word group signal Ks[c] of the teacher data TD[c] are issued. Receiving the key word number signal nofKs[c] and key word group signal Ks[c] of the teacher data TD[c], the learning vector generator 20 operates same as the vector generator 1 of the information evaluation unit 54 in embodiment 1, and the learning vector signal LV is issued.

The KD metric learning unit 28 receives the learning vector signal LV, and when the teacher signal T[c] of the teacher data TD[c] is T=1, the primary affirmative metric signal MY1 is corrected as shown in formula 25. When the teacher signal T[c] of the teacher data TD[c] is T=0, the primary negative metric signal MN1 is corrected as shown in formula 26.

$$MY1[i][j]=MY1[i][j]+LV[i]\cdot LV[j] \quad (25)$$

where i, j=1 to nofDiC, $$MN1[i][j]=MN1[i][j]+LV[i]\cdot LV[j] \quad (26)$$

where i, j=1 to nofDiC.
The value of the teacher data counter is increased by 1, that is, $$c=c+1.$$

Hereinafter, the KD metric learning unit 28 repeats the same operation until the teacher signal T[c] of the teacher data TD[c] becomes T[c]=1 or c=nofTD. When reaching T[c]=$-1$ or c=nofTD, learning of the primary affirmative metric signal MY1 and primary negative metric signal MN1 is terminated.

Next, reading out the all affirmative number signal NY and all negative number signal NN from the count memory unit 25, the affirmative metric signal MY and negative metric signal MN are calculated from the primary affirmative metric signal MY1 and primary negative metric signal MN1. The affirmative metric signal MY and negative metric signal MN to be calculated are preferred to have the same properties as the key word cost signal KD as described below.

That is, comparing with the probability of appearance of necessary article signal $$Q=NY/(NY+NN)$$

the larger the probability of the article signal D provided with character string W[j] as key word to be necessary article signal $$PY[j]/(PY[j]+PN[j])$$

the affirmative metric signal MY is preferred so that the affirmative signal SY may be the larger. Similarly, comparing with the probability of appearance of unnecessary article signal $$(1-Q)=NN/(NY+NN)$$

the larger the probability of the article signal D provided with character string W[j] as key word to be unnecessary for the user $$PN[j]/(PY[j]+PN[j])$$

the negative metric signal MN is preferred so that the negative signal SN may be the larger. As far as the affirmative metric signal MY and negative metric signal MN have the above properties, the values may be other than mentioned below.

As a preferred example, the affirmative metric signal MY is calculated in formula 9, and the negative metric signal MN is calculated in formula 10. Herein, $\epsilon$ is a parameter having a small positive value to avoid division with 0 and evade log0.

$$MY[i][j]=Q\cdot\log((MY1[i][j]+\epsilon)\cdot(1/Q)\cdot(MY1[i][j]+MN1[i][j]+2\epsilon)) \quad (27)$$

$$MY[i][j]=(1-Q)\cdot\log((MN1[i][j]+\epsilon)\cdot(1/(1-Q))\cdot(MY1[i][j]+MN1[i][j]+2\epsilon)) \quad (28)$$

The updated primary affirmative metric signal MY1 (formula 25) is written into the primary affirmative metric signal memory unit 26, the updated primary negative metric signal MN1 (formula 26) into the primary negative metric signal memory unit 27, the newly calculated affirmative metric signal MY (formula 27) into the affirmative metric memory unit 5, and the newly calculated negative metric signal MN (formula 28) into the negative metric memory unit 6.

In this way, the KD metric learning unit 28 terminates the process of metric learning, and sends the metric learning control signal MLC to the learning controller 14. The learning controller 14 receives the metric learning control signal MLC from the KD metric learning unit 28, and changes the learning controller instruction signal LI from 1 to 0, and terminates the process.

Once this process is done, since a code dictionary of the dictionary memory unit 2 is created, the need signal N and reliability signal R issued from the information evaluation unit 54 are no longer 0, and the data of high necessity for the user is listed in the upper positions of the display of the group interface unit 55. Thereafter, by repeating the same process, the effective key word for judging if the information is needed by the user or not is stored in the dictionary memory unit 2 by priority, and information filtering of high precision is realized even in a small dictionary.

In this embodiment 2, however, there is a problem in the adaptive type information filter for calculating the need signal N of the information by using the appearance probability of the information needed by the user, that is, the user not familiar with information retrieval replies "necessary" only to the information needed by own self, and ignores the unnecessary information, and therefore the appearance probability of the information needed by the user may always be 1. This problem may be solved by setting the appearance probability Q of the information needed by the user at other value than 0 or 1, for example, 0.5, as far as the user enters only Necessary or Unnecessary.

Thus, in the information filter using the adaptive type group information filter unit according to embodiment 2, since the adaptiveness to the user is further increased, the need signal of the information needed by the user is a further adequate value and a larger value, and therefore, in the display unit, the information of high necessity for the user is displayed more clearly. Therefore, in the information inquiry apparatus using the adaptive type group information filter unit of embodiment 2, the inquiry destination may be selected more accurately.

(Embodiment 3)

Embodiment 3 of the invention is described below. This embodiment 3 is similar to embodiment 1 or embodiment 2, except that the computation quantity and memory quantity are curtailed by changing each metric signal from two-dimensional matrix to one-dimensional vector. The operation of embodiment 3 is explained below while referring to embodiment 1.

In embodiment 3, the affirmative signal SY is as expressed in formula 29, and the negative signal SN is as expressed in formula 30.

$$SY = \sum_{i=0}^{nofDIC-1} MY[i] \cdot V[i] \quad (29)$$

$$SN = \sum_{i=0}^{nofDIC-1} MN[i] \cdot V[i] \quad (30)$$

When the teacher signal T[c] of the teacher data TD[c] is T=1, the affirmative metric signal MY is updated as in formula 31.

$$MY1[i]=MY1[i]+LV[i] \quad (31)$$

where i=1 to nofDiC.
Similarly, when the teacher signal T[c] of the teacher data TD[c] is T=0, the negative metric signal MN is updated as in formula 32.

$$MN1[i]=MN1[i]+LV[i] \quad (32)$$

where i=1 to nofDiC.
The other is same as in embodiment 1.

In this case of this embodiment, by including the product (AND) of key words or other key word retrieval formula in the dictionary, the coocurrence of key words may be reflected in the vector signal V, which is very much preferred. This method may be changed similarly also in embodiment 2.

(Embodiment 4)

Embodiment 4 of the invention is intended to compose an information distribution apparatus for distributing the information to individual and/or group users interested in the specific information, by using the information inquiry support apparatus disclosed in embodiments 1 to 3.

The information inquiry support apparatus in embodiments 1 to 3 generates a sequential list of users particularly interested in the information when specific information is given. Therefore, by composing the apparatus so as to distribute the information only to a specified number of users from the top of the list, the information distribution apparatus for distributing information selectively only the interested users is realized.

Figure 15:
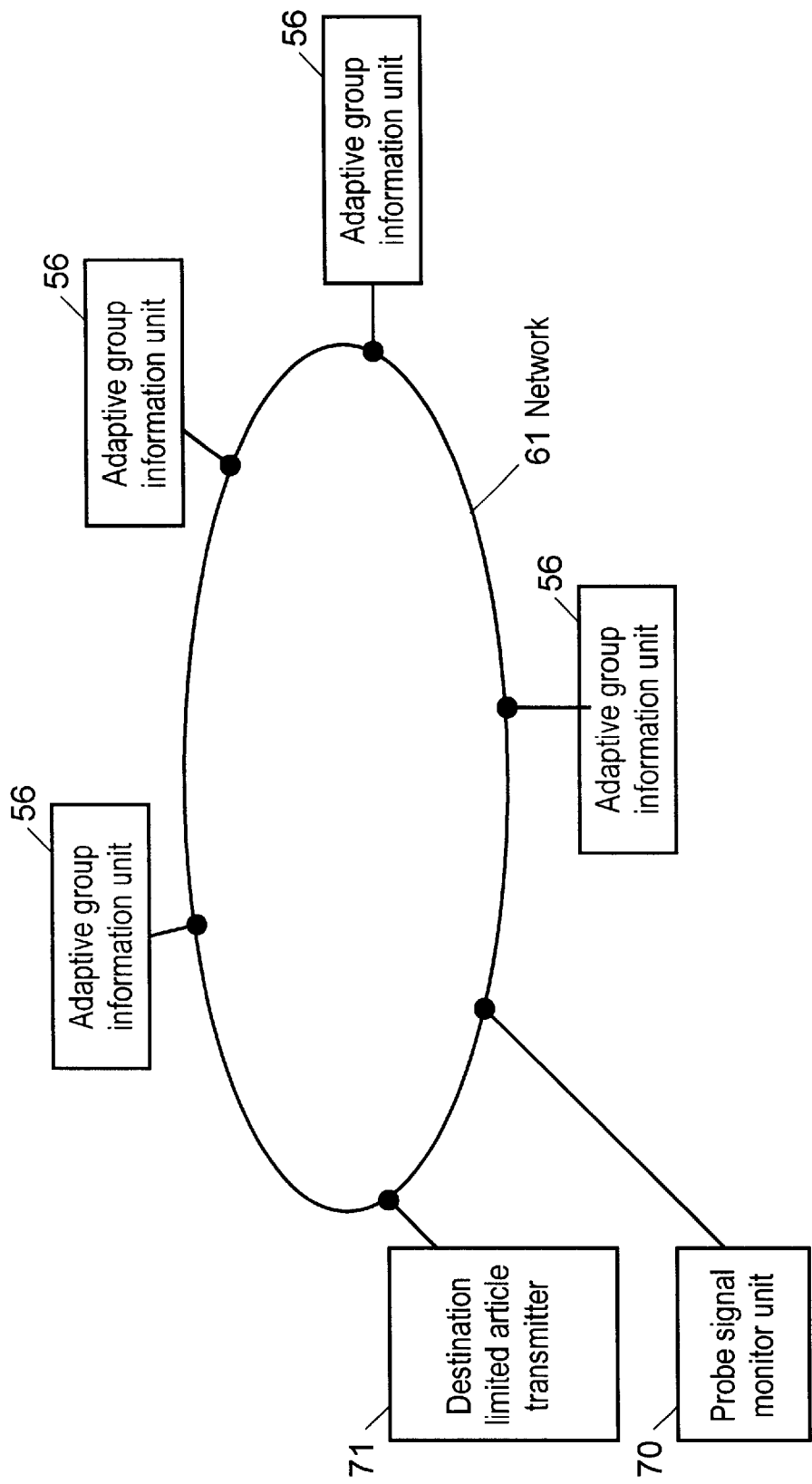
FIG. 15 is a block diagram of an information distribution apparatus in embodiment 4 of the invention.

FIG. 15 is a block diagram showing a configuration of such information distribution apparatus.

The operation of the probe signal monitor unit 70 and adaptive type group information filter units 56 to 59 is same as explained in embodiments 1 to 3 of the invention, and detailed description is omitted.

First, an article signal D to be distributed to interested users is entered from an input unit (not shown) of a destination limited article transmitter 71, and is transferred to the probe signal monitor unit 70. The probe signal monitor unit 70 and adaptive type group information filter units 56 to 59 operate same as mentioned in embodiments 1 to 3, and the probe signal monitor unit 70 creates a user list signal ULS of individual and/or group users interested in the article D. The probe signal monitor unit 70 transfers the user list signal ULS to the destination limited article transmitter 71.

Receiving the user list signal ULS, the destination limited article transmitter 71 receives a number signal NS specifying the number of users as destinations of the article from the input unit, selects the specified number of users according to the number signal NS from the top of the user list signal ULS, and transmits the article signal D to the users by using electronic mail or the like.

Alternatively, the article signal D may be executed by plural article signals of a same kind, and the limitation of destinations may be determined by the value of the need signal N, instead of the number of users.

In this way, according to embodiment 4 of the invention, the specific information can be efficiently distributed only to the users particularly interested in the information. This technique is effective for merchandise guide in electronic commerce, and may be applied in allocation of banner advertisement or the like.

In the foregoing embodiments, each unit is explained as a device coupled through a network, but part or all of functions may be incorporated into one apparatus.

In learning of affirmative metric signal MY and negative metric signal MN, satisfactory effects are obtained by using the method (formula 33) in consideration of the memory-losing effect.

$$MY[i][j]=\alpha \cdot MY[i][j]+LV[i] \cdot LV[j]MN[i][j]=\beta \cdot MN[i][j]+LV[i] \cdot LV[j] \quad (33)$$

where $\alpha$ and $\beta$ are positive values smaller than 1.

It is also preferred to execute the method (formula 34) for preventing overflow of signals when either MY1[i][j] or MN1[i][j] exceeds a specific value.

$$MY1[i][j]=MY1[i][j]/2MN1[i][j]=MN1[i][j]/2 \quad (34)$$

This holds true also in the affirmative number PY[j] and negative number PN[j], and all affirmative number signal NY and all negative number signal NN in the adaptive code dictionary signal FDCK[j].

Further, as reported in the publication (Information Processing Society Technical Report, Natural Language Processing 101-8, May 27, 1994), by adding a key word generator for generating key word group signal and key word number signal from documents, the constitution may be also applied to the information not provided with key word.

In the information having the title, the words composing the title may be used as the key words, and key word number signal and key word group signal may be created. In addition, the key word signal may also include classification symbol such as international patent classification number, so that better results may be obtained without changing the constitution of the invention.

Only one profile for one user is explained herein, but plural profiles may be provided in each different field (for example, job field, research field, hobby region), and when belonging to specific groups of different fields, any one of the plural profiles may be specified to make a group, and the group characteristics are not ambiguous but may be more clarified. Therefore, the inquiry destination of group can be more clearly selected. At the same time, as the information presenting destination, the group selection is more accurate.

The affirmative metric signal and negative metric signal are explained in the cases of one-dimensional vector and two-dimensional matrix, but when expanded in multi-dimensional matrices, it may be easily understood that coocurrence of multiple key words can be handled.

Thus, according to the invention, concerning the information of specific content, how much the user is interested or needs is quantitatively evaluated, and the users at the inquiry destination about this information are easily and accurately selected on the basis of the evaluation, and also the information can be efficiently distributed to the users having high interest or high necessity. In this information-oriented society being further advanced and complicated, flooding of information is prevented, and it contributes to effective distribution of information.

What is claimed is:

1. An information inquiry support apparatus for searching at least one of individual and group users suited for inquiry about specific information, among a plurality of individual and group users using a database system or information communication network, comprising:

a profile of at least one of individual and group users, which is an evaluation table about each one of plural words expressing the information contents, on the basis of evaluation of the degree of concern of the individual and/or group users about the information content, means for creating a need signal expressing quantitatively the degree of concern about the specific information in every individual and group user by using said profile, a plurality of adaptive type group information filter units for generating probe response signals comprised of said need signal and a unit recognition signal which recognizes each name of the plurality of individual and group users, and a probe signal monitor unit for presenting said specific information to said adaptive type group information filter units, receiving said probe response signals and outputting said unit recognition signals on the basis of the magnitude of the need signal.

2. The information inquiry support apparatus of claim 1, wherein said apparatus presents a plurality of information to users, and creates a profile of at least one of the individual and group users, on the basis of the evaluation of presence or absence of concern (or necessity) of users about each information.

3. The information inquiry support apparatus of claim 2, wherein said apparatus includes at least metric signal generating means for generating an affirmative metric signal on the basis of the information the user has concern in (or necessity) (hereinafter called necessary information), and a negative metric signal on the basis of the information the user has no concern in (or necessity) (hereinafter called unnecessary information), and a profile of at least one of the individual and group users composed of said affirmative metric signal and negative metric signal is created.

4. The information inquiry support apparatus of claim 3, further comprising dictionary memory means for storing a dictionary including plural key words, vector generating means for converting the plural key words attached to the information into a vector signal by using said dictionary, cost calculating means for calculating the affirmative score signal and negative score signal by using said affirmative metric signal and vector signal, and said negative metric signal and vector signal, and need calculating means calculating the difference between said affirmative score signal and negative score signal as said need signal.

5. The information inquiry support apparatus of claim 3, wherein said the need calculating means generates the need signal by weighting the difference between said affirmative score signal and negative score signal, so that the necessary information and unnecessary information may be more clearly distinguished.

6. The information inquiry support apparatus of claim 3, wherein said metric signal generating means generates an affirmative metric signal which is a matrix having elements (i, j) calculated from the number of i-th and j-th key word signals of the dictionary simultaneously contained in the necessary information, and a negative metric signal which is a matrix having elements (i, j) calculated from the number of i-th and j-th key word signals of the dictionary simultaneously contained in the unnecessary information.

7. The information inquiry support apparatus of claim 6, wherein said metric signal generating means generates an affirmative metric signal which is a matrix of elements (i, j) for quantitatively evaluating the probability of necessity of the information containing the i-th and j-th key words of the dictionary simultaneously, as compared with the probability of necessity of information, and a negative metric signal which is a matrix of elements (i, j) for quantitatively evaluating the probability of no need of the information containing the i-th and j-th key words of the dictionary simultaneously, as compared with the probability of no need of information.

8. The information inquiry support apparatus of claim 7, wherein said metric signal generating means generates said affirmative metric signal and negative metric signal which are matrices having elements (i, j) calculated from the number of pieces of necessary information and number of pieces of unnecessary information in a plurality of information, the number of pieces of information simultaneously containing i-th and j-th key word signals in the dictionary being necessary, and the number of pieces of information simultaneously containing i-th and j-th key word signals in the dictionary being unnecessary.

9. The information inquiry support apparatus of claim 3, wherein said metric signal generating means generates an affirmative metric signal which is a vector having an i-th element calculated from the number containing the i-th key word signal of the dictionary in the necessary information, and a negative metric signal which is a vector having an i-th element calculated from the number containing the i-th key word signal of the dictionary in the unnecessary information.

10. The information inquiry support apparatus of claim 9, wherein said metric signal generating means generates an affirmative metric signal which is a vector having an i-th element for quantitatively evaluating the probability of necessity of the information containing the i-th key word of the dictionary, as compared with the probability of necessity of information, and a negative metric signal which is a vector having an i-th element for quantitatively evaluating the probability of no need of the information containing the i-th key word of the dictionary, as compared with the probability of no need of information.

11. The information inquiry support apparatus of claim 10, wherein said metric signal generating means generates said affirmative metric signal and negative metric signal which are vectors having an i-th element calculated respectively from the number of pieces of necessary information and number of pieces of unnecessary information, the number of necessity of information containing the i-th key word of the dictionary, and the number of no need of information containing the i-th key word of the dictionary.

12. The information inquiry support apparatus of claim 4, wherein said dictionary memory means stores a dictionary containing plural key words and key word retrieval formula.

13. The information inquiry support apparatus of claim 4, wherein said apparatus includes key word cost signal generating means for generating a key word cost signal showing the validity of each key word on the basis of said profile, and dictionary learning means for changing the dictionary stored in said dictionary memory means on the basis of said key word cost signal.

14. The information inquiry support apparatus of claim 13, wherein said key word cost signal generating means generates the key word cost signal for quantitatively evaluating the probability of necessity and probability of no need of the information containing the key word signal, as compared with the probability of necessity and probability of no need of information.

15. The information inquiry support apparatus of claim 14, wherein said key word cost signal generating means generates a key word cost signal for each key word signal, from the number of pieces of necessary information and number of pieces of unnecessary information, and the number of necessity of information containing the key word signal and the number of no need of information containing the key word signal.

16. The information inquiry support apparatus of claim 13, wherein said dictionary learning means changes the dictionary by discarding the key words of low validity in the dictionary on the basis of the key word cost signal.

17. The information inquiry support apparatus of claim 13, wherein said apparatus includes a count memory unit for storing all affirmative number showing the number of pieces of necessary information and all negative number showing the number of pieces of unnecessary information, concerning a plurality of information, an adaptive dictionary memory unit for storing the correspondence table of the character string comprising key words and numerals to be converted, the affirmative number showing the number of pieces of necessary information provided with key words, and the negative number showing the number of pieces of unnecessary information provided with key words, and a dictionary learning unit for updating the all affirmative number, all negative number, correspondence table, affirmative number and negative number when the profile and the key word cost signal are updated, and further one or plural pieces of new information are presented to the user, and on the basis of the user's evaluation of need or no need of each information and the key words attached to each information, the profile and key word cost signal are updated, so that the dictionary learning unit updates the all affirmative number, all negative number, correspondence table, affirmative number, and negative number.

18. The information inquiry support apparatus of claim 4, wherein said dictionary memory means stores the dictionary including the classification codes as key words.

19. The information inquiry support apparatus of claim 7, wherein said metric signal generating means generates the affirmative metric signal and negative metric signal, by setting the probability of necessity of information at other value than 0 and 1, when the user's evaluation about the information is only Necessary.

20. The information inquiry support apparatus of claim 7, wherein said metric signal generating means generates the affirmative metric signal and negative metric signal, by setting the probability of no need of information at other value than 0 and 1, when the user's evaluation about the information is only Unnecessary.

21. An information inquiry support method for searching at least one of individual and group users suited for inquiry about specific information, among a plurality of individual and group users using a database system or information communication network, comprising steps of:
creating a profile of at least one of individual and group users relating to the degree of concern of the individual and group users about the information content,
calculating a need signal expressing quantitatively the degree of concern about the specific information in every individual and group user by using said profile, and
generating probe response signals comprised of said need signal and a unit recognition signal which recognizes each name of the plurality of individual and group users, said probe response signals being generated by a plurality of adaptive type group information filter units, and
presenting said specific information to said adaptive type group information filter units, and outputting said unit recognition signals on the basis of the magnitude of the need signal.

22. The information inquiry support method of claim 21, wherein the method of expressing the concern of the at least one of the individual and group users at the step of creating the profile is a method of evaluating the presence or absence of concern of users about plural presented pieces of information.

23. The information inquiry support method of claim 22, wherein said profile includes at least an affirmative metric signal generated from the information the user has concern in (necessary information), and a negative metric signal generated from the information the user has no concern in (unnecessary information).

24. The information inquiry support method of claim 23, wherein at the step of calculating the need signal, the plural key words attached to the specific information are converted into a vector signal by using a dictionary storing plural key words preliminarily, the affirmative score signal and negative score signal are calculated by using the affirmative metric signal and vector signal, and the negative metric signal and vector signal, and the difference between the affirmative score signal and negative score signal is calculated as the need signal.

25. The information inquiry support method of claim 23, wherein at the step of calculating the need signal, the need signal is calculated by weighting the difference between the affirmative score signal and negative score signal, so that the necessary information and unnecessary information may be more clearly distinguished.

26. The information inquiry support method of claim 24, wherein the affirmative metric signal and negative metric signal are respectively an affirmative metric signal which is a matrix having elements (i, j) calculated from the number of i-th and j-th key word signals of the dictionary simultaneously contained in the necessary information, and a negative metric signal which is a matrix having elements (i, j)

calculated from the number of i-th and j-th key word signals of the dictionary simultaneously contained in the unnecessary information.

27. The information inquiry support method of claim 24, wherein the affirmative metric signal and negative metric signal are respectively an affirmative metric signal which is a matrix of elements (i, j) for quantitatively evaluating the probability of necessity of the information containing the i-th and j-th key words of the dictionary simultaneously, as compared with the probability of necessity of information, and a negative metric signal which is a matrix of elements (i, j) for quantitatively evaluating the probability of no need of the information containing the i-th and j-th key words of the dictionary simultaneously, as compared with the probability of no need of information.

28. The information inquiry support method of claim 27, wherein the affirmative metric signal and negative metric signal are respectively matrices having elements (i, j) calculated from the number of pieces of necessary information and number of pieces of unnecessary information in a plurality of information, the number of pieces of information simultaneously containing i-th and j-th key word signals in the dictionary being necessary, and the number of pieces of information simultaneously containing i-th and j-th key word signals in the dictionary being unnecessary.

29. The information inquiry support method of claim 24, wherein the affirmative metric signal and negative metric signal are respectively an affirmative metric signal which is a vector having an i-th element calculated from the number containing the i-th key word signal of the dictionary in the necessary information, and a negative metric signal which is a vector having an i-th element calculated from the number containing the i-th key word signal of the dictionary in the unnecessary information.

30. The information inquiry support method of claim 24, wherein the affirmative metric signal and negative metric signal are respectively an affirmative metric signal which is a vector having an i-th element for quantitatively evaluating the probability of necessity of the information containing the i-th key word of the dictionary, as compared with the probability of necessity of information, and a negative metric signal which is a vector having an i-th element for quantitatively evaluating the probability of no need of the information containing the i-th key word of the dictionary, as compared with the probability of no need of information.

31. The information inquiry support method of claim 30, wherein the affirmative metric signal and negative metric signal are respectively vectors having an i-th element calculated respectively from the number of pieces of necessary information and number of pieces of unnecessary information, the number of necessity of information containing the i-th key word of the dictionary, and the number of no need of information containing the i-th key word of the dictionary.

32. The information inquiry support method of claim 24, wherein said dictionary contains key word retrieval formula.

33. The information inquiry support method of claim 24, wherein a key word cost signal showing the validity of each key word is generated on the basis of said profile, and the dictionary is changed on the basis of said key word cost signal.

34. The information inquiry support method of claim 33, wherein the key word cost signal is a signal for quantitatively evaluating the probability of necessity and probability of no need of the information containing the key word signal, as compared with the probability of necessity and probability of no need of information.

35. The information inquiry support method of claim 34, wherein the key word signal is calculated for each key word signal, from the number of pieces of necessary information and number of pieces of unnecessary information, and the number of necessity of information containing the key word signal and the number of no need of information containing the key word signal.

36. The information inquiry support method of claim 33, wherein the key words of low validity in the dictionary are discarded on the basis of the key word cost signal.

37. The information inquiry support method of claim 23, wherein one or plural pieces of new information are presented to the user, and on the basis of the user's evaluation of need or no need of each information and the key words attached to each information, the profile and key word cost signal are updated, and further on the basis of the updated profile and key word cost signal, the all affirmative number showing the number of pieces of necessary information, all negative number showing the number of pieces of unnecessary information, correspondence table for converting the character string showing key words into numerals, affirmative number showing the number of pieces of necessary information provided with key words, and negative number showing the number of pieces of unnecessary information provided with key words are also updated.

38. The information inquiry support method of claim 24, wherein said dictionary includes the classification codes as key words.

39. The information inquiry support method of claim 27, wherein the affirmative metric signal and negative metric signal are generated by setting the probability of necessity of information at other value than 0 and 1, when the user's evaluation about the information is only Necessary.

40. The information inquiry support method of claim 27, wherein the affirmative metric signal and negative metric signal are generated by setting the probability of no need of information at other value than 0 and 1, when the user's evaluation about the information is only Unnecessary.

41. An information distribution apparatus for transmitting specific information to specific users, comprising:
 an information inquiry support apparatus as set forth in claim 21, and
 a destination limited article transmitter for determining the transmission destinations by using names of at least one of plural individual and group users issued from the output means of said information inquiry support apparatus.

42. The information distribution apparatus of claim 41, wherein the destination limited article transmitter determines the transmission destinations to a specified number of users in a specified sequence of the corresponding need signal among the at least one of plural individual and group users.

43. The information distribution apparatus of claim 41, wherein the destination limited article transmitter determines the transmission destinations to the names of at least one of plural individual and group users having the need signal of a certain value or more.

44. An information distribution method for transmitting specific information to specific users, wherein transmission destinations are determined by using names of at least one of plural individual and group users suited to inquiry of the specific information, issued from an information inquiry support method as set forth in claim 21.

45. The information distribution method of claim 44, wherein the transmission destinations are a specified number of users in a specified sequence of the corresponding need signal among the at least one of plural individual and group users.

46. The information distribution method of claim 44, wherein the transmission destinations are the names of the at least one of plural individual and/or group users having the need signal of a certain value or more.

* * * * *